US011061955B2

(12) United States Patent
Alexander et al.

(10) Patent No.: US 11,061,955 B2
(45) Date of Patent: *Jul. 13, 2021

(54) INTENT CLASSIFICATION SYSTEM

(71) Applicant: salesforce.com, inc., San Francisco, CA (US)

(72) Inventors: Zachary Alexander, Berkeley, CA (US); Naren M. Chittar, Saratoga, CA (US); Alampallam R. Ramachandran, Bellevue, WA (US); Anuprit Kale, Oakland, CA (US); Tiffany McKenzie, San Francisco, CA (US); Sitaram Asur, Santa Clara, CA (US); Jacob Nathaniel Huffman, Oakland, CA (US)

(73) Assignee: salesforce.com, inc., San Francisco, CA (US)

(*) Notice: Subject to any disclaimer, the term of this patent is extended or adjusted under 35 U.S.C. 154(b) by 104 days.

This patent is subject to a terminal disclaimer.

(21) Appl. No.: 16/233,420

(22) Filed: Dec. 27, 2018

(65) Prior Publication Data

US 2020/0097496 A1 Mar. 26, 2020

Related U.S. Application Data

(63) Continuation-in-part of application No. 16/138,514, filed on Sep. 21, 2018.

(51) Int. Cl.
*G06F 16/35* (2019.01)
*G06T 11/20* (2006.01)
*G06N 20/00* (2019.01)
*G06F 16/332* (2019.01)
*G06F 16/33* (2019.01)

(52) U.S. Cl.
CPC ........ *G06F 16/355* (2019.01); *G06F 16/3329* (2019.01); *G06F 16/3347* (2019.01); *G06N 20/00* (2019.01); *G06T 11/206* (2013.01)

(58) Field of Classification Search
None
See application file for complete search history.

(56) References Cited

U.S. PATENT DOCUMENTS

| | | | | |
|---|---|---|---|---|
| 6,346,952 B1 * | 2/2002 | Shtivelman | ......... | H04M 3/5191 715/758 |
| 10,210,244 B1 * | 2/2019 | Branavan | ................ | G06F 40/30 |
| 2017/0228367 A1 * | 8/2017 | Pasupalak | ............... | G06F 40/40 |
| 2018/0165723 A1 * | 6/2018 | Wright | ............... | G06Q 10/0635 |
| 2019/0325081 A1 * | 10/2019 | Liu | ...................... | G06F 16/3344 |
| 2020/0005503 A1 * | 1/2020 | He | .......................... | G06F 40/30 |
| 2020/0074984 A1 * | 3/2020 | Ho | ........................ | G10L 15/063 |

OTHER PUBLICATIONS

Mikolov et al., "Efficient Estimation of Word Representations in Vector Space," arXiv.org, Jan. 16, 2013, 12pgs, v.3.

* cited by examiner

*Primary Examiner* — Richard L Bowen
(74) *Attorney, Agent, or Firm* — Holland & Hart LLP

(57) ABSTRACT

A data processing system analyzes a corpus of conversation data collected at an interactive conversation service to train an intent classification model. The intent classification model generates vectors based on the corpus of conversation data. A set of intents is selected and an intent seed input for each intent of the set of intents is input into the model to generate an intent vector corresponding to each intent. Vectors based on user inputs are generated and compared to the intent vectors to determine the intent.

22 Claims, 15 Drawing Sheets

INTENT CLASSIFICATION SYSTEM

CROSS REFERENCES

The present Application for Patent is a Continuation in Part of U.S. patent application Ser. No. 16/138,514 by Alexander et al., entitled "Intent Classification System," filed Sep. 21, 2018, assigned to the assignee hereof.

FIELD OF TECHNOLOGY

The present disclosure relates generally to database systems and data processing, and more specifically to intent classification system.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may support a chat system that allows a customer support agent to live-chat with a customer. The chat may be utilized to help a customer regarding purchases, returns, order status, etc. An agent, which uses the chat system to converse with the customer, may periodically reply with the same or similar responses to customer inputs, which may be time consuming, and thus expensive, for the agent or the agent's organization.

DETAILED DESCRIPTION

Figure 1:
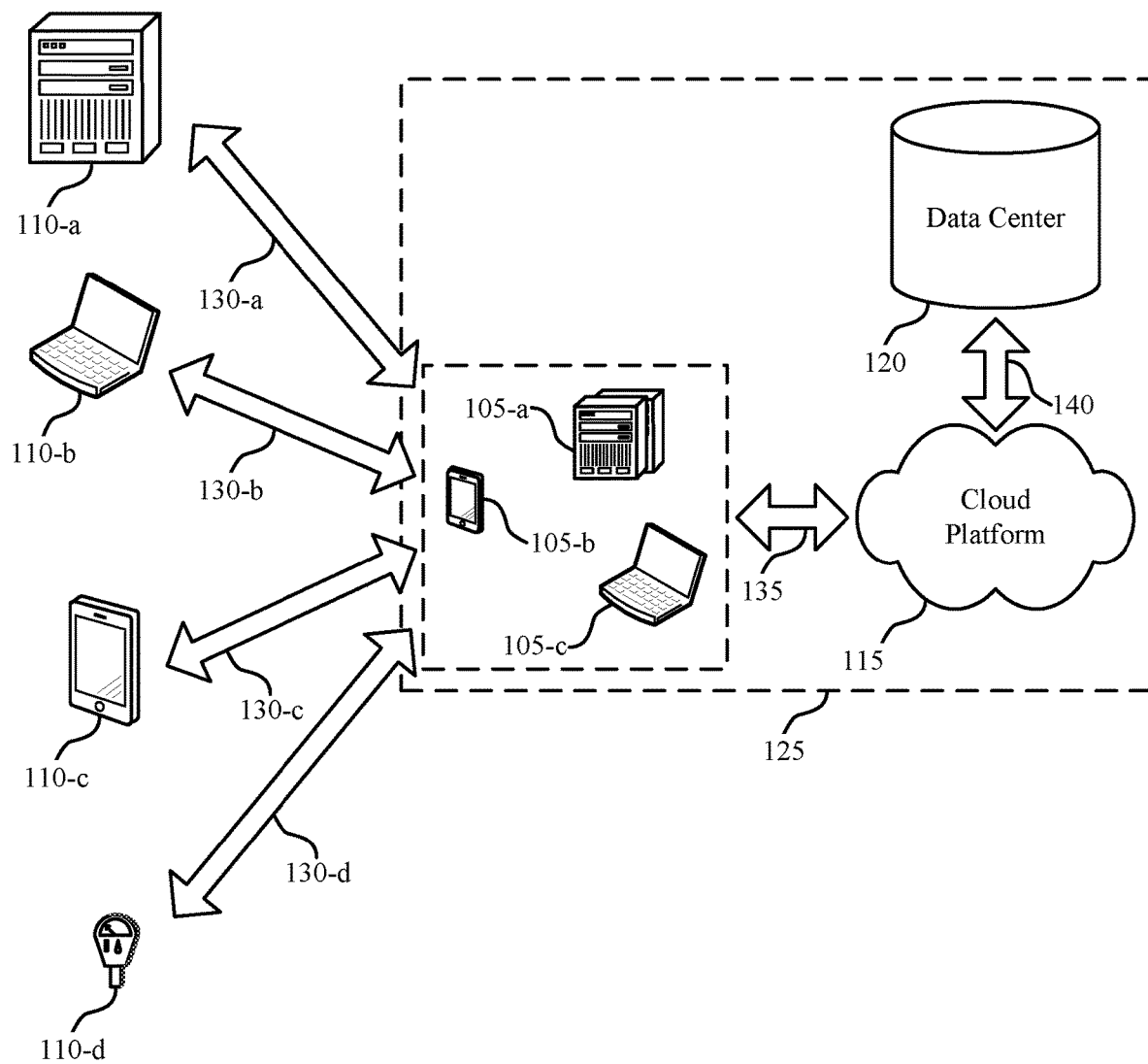
FIG. 1 illustrates an example of a system for intent classification that supports intent classification in accordance with aspects of the present disclosure.

An intent classification system described herein is trained on a corpus of unlabeled conversation data that is based on previous conversation sessions between users and agents. The system utilizes a word embedding function trained on the corpus of conversation data and is used in a live conversation session to classify inputs by users with an intent. The system allows for intents to be derived based on a single input and using a model trained in an unsupervised manner.

The intent classification system includes a training component that generates training data based on the corpus of unlabeled conversation data and trains a model for intent classification using the training data. The training data is generated by creating a set of context-response pairs and labels corresponding to each pair. The context-response pairs include a context, which includes at least an input by a user during a conversation session at an interactive conversation service, and a response, which may a response by an agent during the same conversation or a randomly selected response by an agent. When the context and response of a context-response pair are selected from the same conversation session, the label corresponding to the context-response pair is set with a first value (e.g., "1," which indicates that the pair is true). When the context and the response of a context-response pair are selected from different conversation sessions, the corresponding label is set with a second value (e.g., "0," which indicates that the pair is false). Each context and response of a context-response pair is input into a word embedding function to generate a context vector and a response vector. The context vector and response vector are compared to determine similarity, and the similarity and corresponding label are input into a loss-function to back-propagate errors into the model as the model is trained.

In some cases, the intent classification system considers a window in determining whether the values are true (e.g., "1") or false (e.g., "0"), which may assist in accurately training the model. For example, if the context and the response are selected from the same conversation session, but outside a predetermined window of sequential inputs (e.g., ten sequential inputs), then the value may be set to 0. Similarly, if the context and the response are selected from same conversation session but within the window, the value may be set to 1. This implementation assumes that contexts and responses that are input closer to each other are more informative than inputs that are further away. In other words, the "context" of the conversation may change as the conversation occurs. The window may be determined based on a number of inputs between the context and response (e.g., greater than a threshold is "outside" the window and under a threshold is "inside" the window). Similarly, the window may be a symmetrical or asymmetrical window (defined by a number of sequential inputs) about the input or context input.

After the model is trained on an entity's (e.g., an organization's) corpus of conversation data, the entity may select a set of intents and an intent seed input corresponding to each intent of the set of intents. The trained model uses the intent seed inputs to generate intent vectors corresponding to each intent of the set of intents. During a live conversation session at the interactive conversation service, input vectors are generated by the model based on inputs by a user. The input vectors are compared to the intent vectors, and the most similar intent vector is selected and corresponds to the intent of the user's input.

In some cases, the model may suggest intent seed inputs for categories. After the model is trained, the model consists of highly structured conversation data including a plurality of intent vectors. A clustering process may cluster the plurality of intent vectors into a set of clusters based on distance score calculations between each of the plurality of intent vectors. The clusters may correspond to the potential intent categories based on the similarities between the vectors (e.g., the similarities of contexts on which the vectors are based), and a user may assign an intent category to the clustered vectors. From each cluster, the system may select one or more vectors and recommend the associated input(s) for one or more intent seed inputs for the cluster (e.g., category). The selected vector(s) may be vectors that are at or near the "center" of the cluster, for example, which may be provide ideal candidates for the intent vectors for comparison to later inputs. Accordingly, a user (or the model itself) may select one or more intent seed inputs for each intent category based on vectors selected from the clustered plurality of vectors.

Because the model is trained on unlabeled data, the model is trained in an unsupervised manner. Further, generation and use of the training data provides a highly informative model. For example, because the model is trained on historical chat data corresponding to an entity such as an organization, the chat data is highly structured in that the chat data may include highly similar chat context and responses. For example, chat data corresponding to an online retailer may have many conversations corresponding to order status, returns, etc. Furthermore, the data does not need to be labeled or classified by a user or administrator. The chat data may be processed, and the model may be generated without any or very little user interaction.

Further, because the model is generated on highly structured data, additional intents may be easily added without retraining the model. Additional intent seed inputs are input into the model, and the additional intent vectors are generated. Further, all of the vectors generated on the training data and on live data are highly informative for different reasons. The vectors may be projected into two-dimensional vectors and displayed on a plot. Certain filtering, zooming, label and selection techniques may be implemented such that an administrator may visualize and analyze the data.

Aspects of the disclosure are initially described in the context of an environment supporting an on-demand database service. Aspects of the disclosure are further described with respect to a general system diagram, a model training system, a real-time use system, a process flow diagram, and a display. Aspects of the disclosure are further illustrated by and described with reference to apparatus diagrams, system diagrams, and flowcharts that relate to intent classification system.

FIG. 1 illustrates an example of a system 100 for cloud computing that supports intent classification in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

Cloud platform 115 may offer an on-demand chat service to the cloud client 105. The cloud client 105 may utilize the chat service for customer support for the contacts 110, for example. In some example implementations, a contact 110 may access the chat service via a browser or an application at a device of the contact 110. For example, a cloud client 105 is an internet retailer, and customers of the internet retailer interact with agents of the internet retailer via the chat service. In some cases, the chat service is a bot, which responds to customer inquiries without interaction by agent. The customers may utilize the chat service to resolve issues or receive information regarding orders, returns, product issues, etc. Because agents may interact with many different customers via the chat service, the agents may enter similar responses to many different, but similar, inquiries. Furthermore, in the chat bot scenario, the chat bot is configured to determine an "intent" of a user inquiry so that the bot may transmit a relevant response. Thus, a cloud client 105 may predefine a set of potential intents such that the chat bot may respond with a relevant reply. Implementations described herein provide a system that classifies a customer input into one of a set of intents provided by the cloud client 105. The implementations are described with respect to a text chat system, but it should be understood that the implementations are applicable to many types of interactive conversation service, such as chat bots, intelligent assistants, email systems, voice chat systems, etc.

In some intent classification systems, each intent of a set of intents provided by a cloud client require many (e.g., hundreds or thousands) of example inputs (e.g., phrases) that are classified to each intent. For example, for an "order status" intent, the cloud client may submit one thousand phrases that are manually selected and classified as an order status intent. A machine learning model is trained on the set of intents and set of example inputs for many intents. Such systems require potential inputs to be labeled (e.g., categorized) and thus are supervised models. Furthermore, when such models are utilized for intent classification, user inputs may be compared to many (e.g., thousands or millions) of data points to determine the intent classification of the user inputs. Such comparisons require significant processing resources.

In contrast, aspects of the disclosure described herein provide an intent classification system that is trained, in an unsupervised manner, on unlabeled historical conversation data. The historical conversation data includes a series of inputs (e.g., by a user) and responses (e.g., by a bot or agent) for many different conversations. A corpus of historical chat data may correspond to a particular cloud client 105, and thus the chat data is highly structured. The chat data is highly structure because chat conversations may cover a narrow range of topics (e.g., order status, receipt, return process). That is, a conversation session may generally be related to a single intent. Each conversation session of the chat data generally tends to relate to a narrow topic, and the conversation data includes defined relationships (e.g., user/customer and agent). Furthermore, agent responses tend to be repetitive. Training data is generated using the historical chat data, and the training data is used to train an intent classification model.

The training model includes a training data generator, an embedding component, a vector comparison component, and a loss calculation component. The training data generator generates the training data for the model by generating a set of context-response pairs and a label corresponding to each context-response pair of the set based on the historical conversation data. The context of a context-response pair may include at least an input by a user at an interactive conversation service during a conversation session, and a response of a context-response pair includes an input by an agent (or the bot) during a conversation session. Accordingly, when training data is generated, context-response pairs generated from the same conversation sessions are labeled with a first value (e.g., "1", which indicates that the pair is true and that the context and the response are likely related to the same intent), and context-response pairs generated from different conversation sessions are labeled with a second value (e.g., "0," which indicates that the pair is false and that the context and the response are unlikely related to the same intent). The word embedding function is trained on the context-response pairs and generates a vector for each context and response. Vectors corresponding to the context-response pairs are evaluated for similarity and the loss is calculated (e.g., by the loss calculation component) using the corresponding labels (e.g., 1 or 0), which optimizes the model by back-propagating errors through a neural network (e.g., the word embedding function) as the model is trained. Accordingly, because the word embedding functions are trained using structured data, a highly informative vector space conversations is generated, and the functions are trained to generate informative vectors.

As discussed herein, the training data generator may also consider a window when determining the training data. For example, if the context and the response are selected from the same conversation session, but outside a predetermined window of sequential inputs (e.g., ten sequential inputs), then the value may be set to 0. Similarly, if the context and the response are selected from same conversation session but within the window, the value may be set to 1. This implementation assumes that contexts and responses that are input closer to each other are more informative than inputs that are further away. In other words, the "context" of the conversation may change as the conversation occurs. The window may be determined based on a number of inputs between the context and response (e.g., greater than a threshold is "outside" the window and under a threshold is "inside" the window). Similarly, the window may be a symmetrical or asymmetrical window (defined by a number of sequential inputs) about the user input or context input.

After the model is trained on the cloud client's 105 corpus of conversation data, the cloud client 105 selects a set of intents and an intent seed input corresponding to the set. The trained model uses the intent seed inputs to generate intent vectors corresponding to each intent of the set of intents. During a live conversation session at the interactive conversation service, input vectors are generated by the model based on inputs by a user. The input vectors are compared to the intent vectors, and the most similar intent vector is selected and corresponds to the intent of the user's input. The determined intent may be utilized to trigger a response by a chat bot.

In some cases, the cloud client 105 selects the intent seed inputs for the set of intents from recommended intent seed inputs. For example, after the model is trained, the model contains highly structured data including a plurality if intent vectors. The vectors may be separated into clusters based on distance calculations between the plurality of vectors. These clusters may correspond to each intent or category. The system may then select at least one input vector from each category as the basis for one or more recommended intent seed inputs for each cluster. The inputs corresponding to the selected input vectors may be recommended to a user (e.g., the cloud client 105) for selection for the intent seed inputs for the categories. The selected vectors may be selected based on how "central" the vector is in the cluster. A more centered vector may be an informative candidate for a particular intent.

Accordingly, aspects described herein provide an unsupervised intent classification model that is trained on a corpus of existing and unlabeled data. Because new inputs are compared to intent vectors (generated using the trained model), the inputs are not compared to the entire vector space. Thus, significant processing resources are not required to compare input vectors to the entire vector space. An example cloud client 105 may have ten intents. Thus, a new input may be compared to ten intent vectors rather than an entire vector space corresponding to the historical chat data. Furthermore, the addition of a new intent by a cloud client 105 is easily added to the model. An intent seed input corresponding to the new intent is used to generate a new intent vector, and subsequent inputs by users are compared to the new intent vector as well as previous intent vectors. Thus, the model is not required to be retrained on new data for the new intent.

It should be appreciated by a person skilled in the art that one or more aspects of the disclosure may be implemented in a system 100 to additionally or alternatively solve other problems than those described herein. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

In an example use of the system 100, a cloud client 105 elects to utilize the intent classification system. A corpus of historical chat data of the cloud client 105 is analyzed to train the response recommendation model. As will be described in more detail below, model training requires very little or no input on the part of an administrator. Once the model is trained, the cloud client 105 may select a set of intents and corresponding intent seed inputs. During use of the system by a user (e.g., a customer), vectors based on user inputs are generated using the model, and the resulting vectors are compared to intent vectors generated using the model and which correspond to the selected intents. The intent corresponding to the most similar intent vector is selected, and a response may be input into the interactive conversation service based on the intent in a reply to the user.

Figure 2:
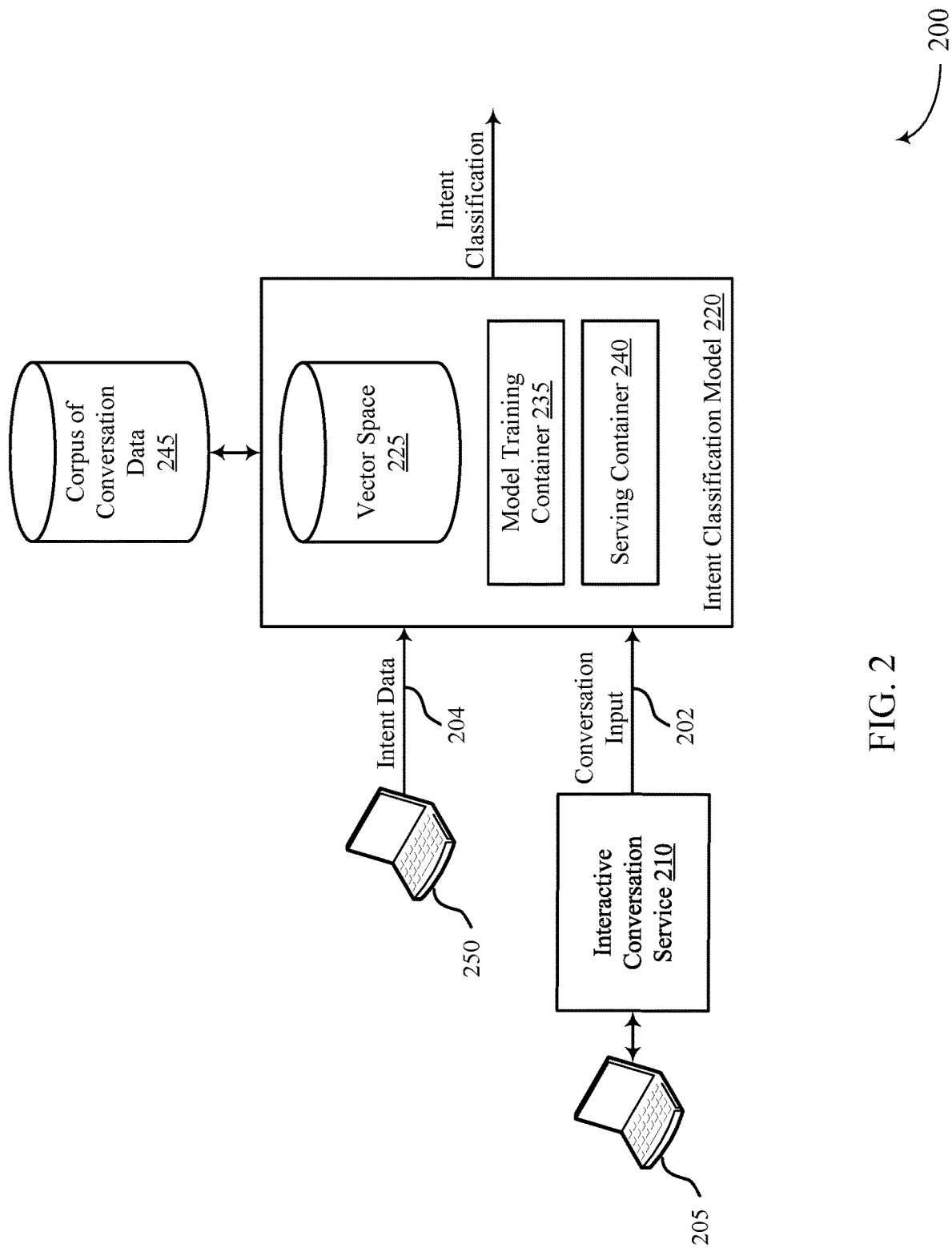
FIG. 2 illustrates an example of a system that supports intent classification in accordance with aspects of the present disclosure.

FIG. 2 illustrates an example of a system 200 that supports intent classification in accordance with aspects of the present disclosure. The system 200 includes a user device 205, a client device 250, an interactive conversation service 210, and an intent classification model 220. The intent classification model 220, which may be an example of an intent classification module 715 of FIG. 7, includes a model training container 235, a serving container 240, and a data store corresponding to a vector space 225. The model training container 235, which may be an example of a model training container 310 of FIG. 3, includes components for generating training data and training a word embedding function on a corpus of conversation data 245, which may be received from a cloud client 105 of FIG. 1. In the process of training the word embedding function, a plurality of vectors are generated corresponding to contexts and responses of context-response pairs generated for training data. The plurality of vectors correspond to the vector space 225. The vector space 225 includes inputs corresponding to conversation sessions mapped to vectors of real numbers.

The client device 250 may be a cloud client 105 of FIG. 1 and may provide the corpus of conversation data 245 for training the model. After the model is trained, the client device 250 provides intent data via a communication link 204. The intent data may include a set of intent classifications and one or more intent seed inputs corresponding to each intent classification of the set of intent classifications. For example, an intent may be "order status" and a corresponding intent seed input may be "what is the status of my order." The intent seed inputs may be based on inputs received at the interactive conversation service 210. The trained word embedding function generates a set of intent vectors based on the intent seed inputs, such that each intent vector corresponds to an intent category.

In some cases, the intent data, including the one or more intent seed inputs corresponding to each intent category or classification, may be selected from recommended inputs generated by the intent classification model 220. For example, the vector space 225 may be separated into a plurality of clusters based on distances calculated between the vectors. The distance calculations may use cosine similarity, Manhattan distance, Euclidean distance, or other vector distance calculation techniques. The clusters may correspond to the intent categories. From each cluster, the model 220 may select one or more vectors for the basis of an intent seed input recommended. For example, the model 220 selects a vector that is near the center of the cluster for the basis of an intent seed input for the category associated with the cluster. The system 200 may recommend the inputs corresponding to the selected vectors to a user (e.g., at the client device 250) as recommended intent seed inputs for one or more of the categories. Thus, some of the set of intent vectors may be based on recommended intent seed inputs pulled from the vector space 225.

The intent classification model 220 is linked to the interactive conversation service 210 via communication link 202. The serving container 240, which may be an example of a serving container 410 described with respect to FIG. 4, receives conversation input data corresponding to a user via the communication link 202. The conversation input data may include an input by the user (e.g., a text inquiry submitted to interactive conversation service 210) and may trigger the intent classification process. The serving container 240 generates an input vector based on the received input and compares the input vector to the set of intent vectors corresponding to the intent categories. The serving container 240 selects the intent corresponding to the intent vector that is most similar to the input vector as the intent. The intent classification model 220 outputs an intent classification, which may be utilized to determine a response to the user's input. For example, if the input is "where is my order and when will I receive it," the input may be classified to the "order status" intent. Based on the order status intent, the chat system may respond with "can you please provide an order number for your order?"

Figure 3:
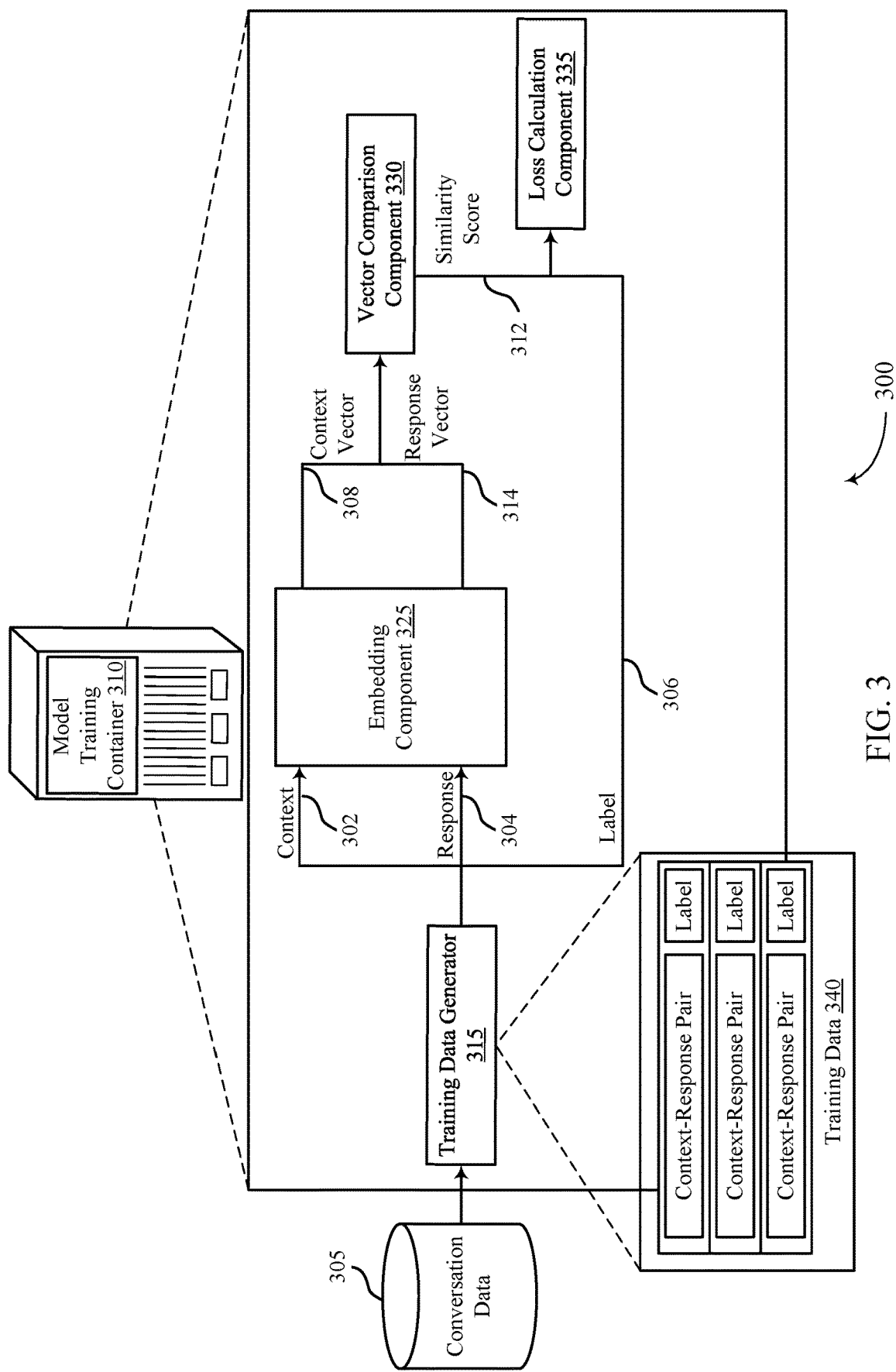
FIG. 3 illustrates an example of a model training system that supports intent classification in accordance with aspects of the present disclosure.

FIG. 3 illustrates an example of a model training system 300 that supports intent classification in accordance with aspects of the present disclosure. The system 300 includes a model training container 310, which uses a corpus of conversation data 305 to generate a response recommendation model. The model training container 310 generates training data 340 based on the corpus of conversation data 305. The training data 340 includes a set of context-response pairs and labels corresponding to each context-response pair. To generate the context-response pairs, the training data generator 315 may select a context corresponding to a conversation session. In some example implementations, a conversation session corresponds to interaction between a user and an agent before the conversation is closed by the user or the agent. The context includes an arbitrary input by a user during a conversation session. For example, an input may correspond to a string of text that is typed by the user followed by a submission (e.g., keying "enter" or pressing send). An input may include a single word or series of words. A response from an agent during the same conversation session as the input may be selected, or a response may be randomly selected from the corpus of conversation data 305. When the response corresponds to a context in the same conversation session, the label corresponding to the context-response pair is given a first value (e.g., "1," which indicates that the pair is true or corresponds to the same conversation session). When the response is randomly selected for a context-response pair, the corresponding label is given a second value (e.g., "0," which indicates that the pair is false or does not correspond to the same conversation session).

In some cases, a user or administrator may configure the model training system 300. For example, the user selects a percentage of context-response pairs that are true (e.g., assigned a first value of "1"). Furthermore, different weights may be applied to context and response inputs, and the weights may be configurable. Other configuration techniques are contemplated.

A plurality of context-response pairs and labels may be generated for the training data 340. Some of the context-response pairs include true pairs that are selected from the same conversation session, and some of the context-response pairs are false pairs that are not selected from the same conversation session. The number of true pairs of the set may be configured by an administrator before the data is trained.

Each context 302 and response 304 are input into an embedding component 325. The context 302 and the response 304 may be pre-processed before being processed by the embedding component 325. Such pre-processing may be performed by the training data generator 315 and may include tokenizing the inputs. The embedding component 325 may be an example of a component enabling neural networks that map text inputs (e.g., strings of text) to fixed-length vectors.

The embedding component 325 generates a context vector 308 based on the input context 302, and the embedding component 325 generates a response vector 314 based on the input response 304. For each context-response pair, a vector comparison component 330 compares the context vector 308 and the response vector 314 and outputs a similarity score 312. Calculation of similarities between vectors as described herein may be based on a variety of techniques including without limitation, cosine similarity, Manhattan distance, Euclidean distance, etc. The similarity score 312 and the label 306 corresponding to the context-response pair are input to a loss calculation component 335. The loss calculation component 335 implements a loss-function that optimizes the model by back-propagating errors through the neural network (e.g., the embedding component 325) as the model is trained.

Figure 4:
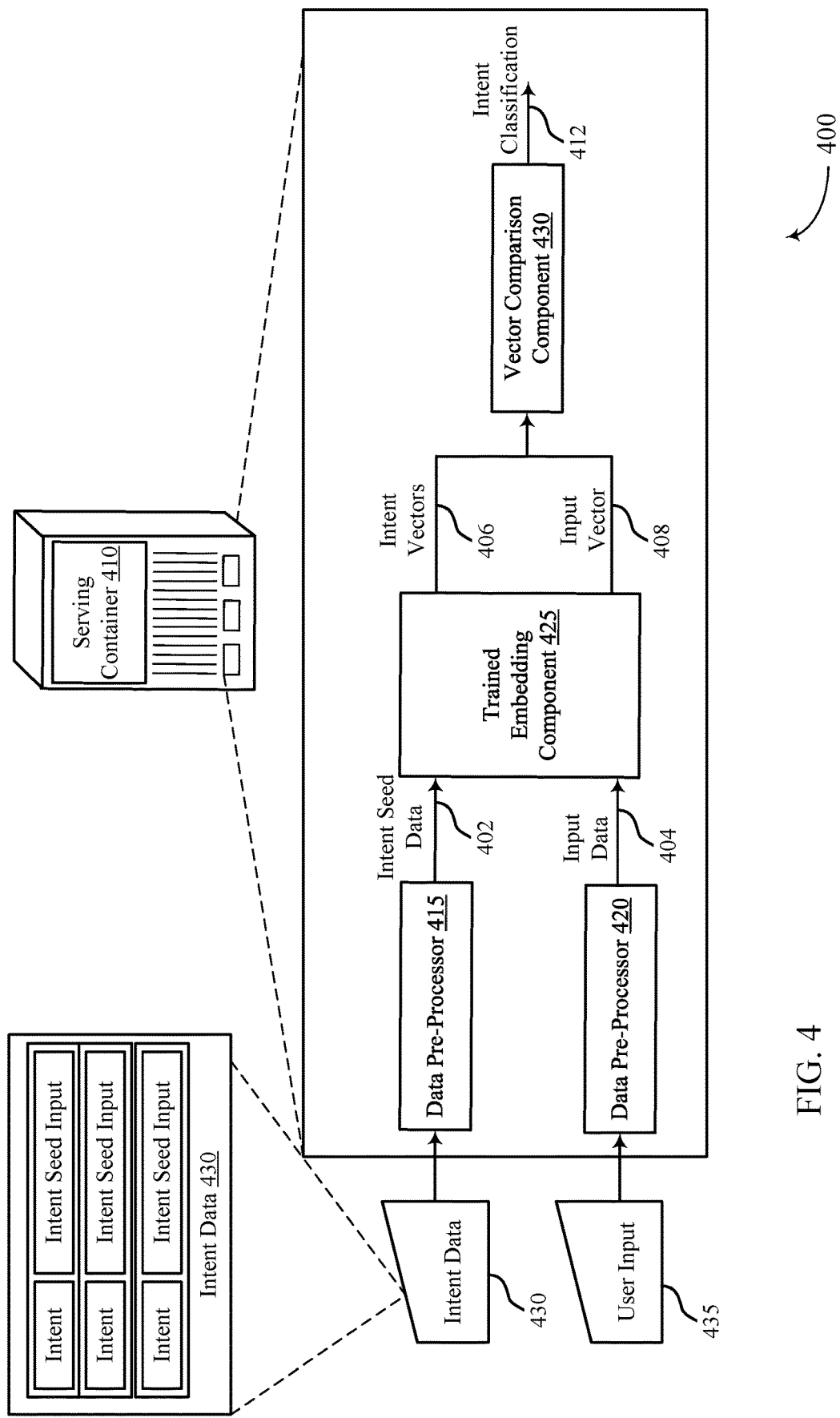
FIG. 4 illustrates an example of a serving system that supports intent classification in accordance with aspects of the present disclosure.

FIG. 4 illustrates an example of a serving system 400 that supports intent classification in accordance with aspects of the present disclosure. The system 400 includes a serving container 410 that includes, data pre-processors 415 and 420, a trained embedding component 425, and a vector comparison component 430. The trained embedding component 425 may be an example of a trained embedding component 325 of FIG. 3. Intent data 430 is input in to the serving container 410. The intent data 430 includes a set of intents with corresponding intent seed inputs. The intent seed inputs may be phrases or example inputs that are categorized to the corresponding intent. The data pre-processor 415 processes the intent seed inputs and outputs intent seed data 402 for the trained word embedding component 425. Such processing may include parsing and tokenizing the input. The trained embedding component 425 generates a set of intent vectors 406 based on the intent seed data 402. The intent vectors 406 are mappings of the intent seed data 402 into vectors of real numbers. The intent vectors 406 may be stored in an intent vector datastore for subsequent intent classification procedures.

The serving container 410 is connected to an interactive conversation service that transmits user inputs 435 to the serving container 410. The user inputs 435 may be transmitted when the user enters a word or phrase into the interactive conversation service, and receipt of the user inputs 435 may trigger the intent classification procedure. The user inputs are processed by the data pre-processor 420, which may be an example of the data pre-processor 415. The data pre-processor 420 outputs input data 404 to the trained embedding component 425. The trained embedding component 425 generates an input vector 408 based on the input data 404. The vector comparison component 430 compares the input vector 408 to the set of intent vectors 406. Based on the comparison, the vector comparison component outputs an intent classification 412, which corresponds to the intent vector 406 with the highest similarity to the input vector 408. In some cases, the vector comparison component 430 identifies the intent vector based on a nearest neighbor technique. The intent may be used by the interactive conversation service, or a supporting service, to transmit a reply to the user input 435.

Figure 5:
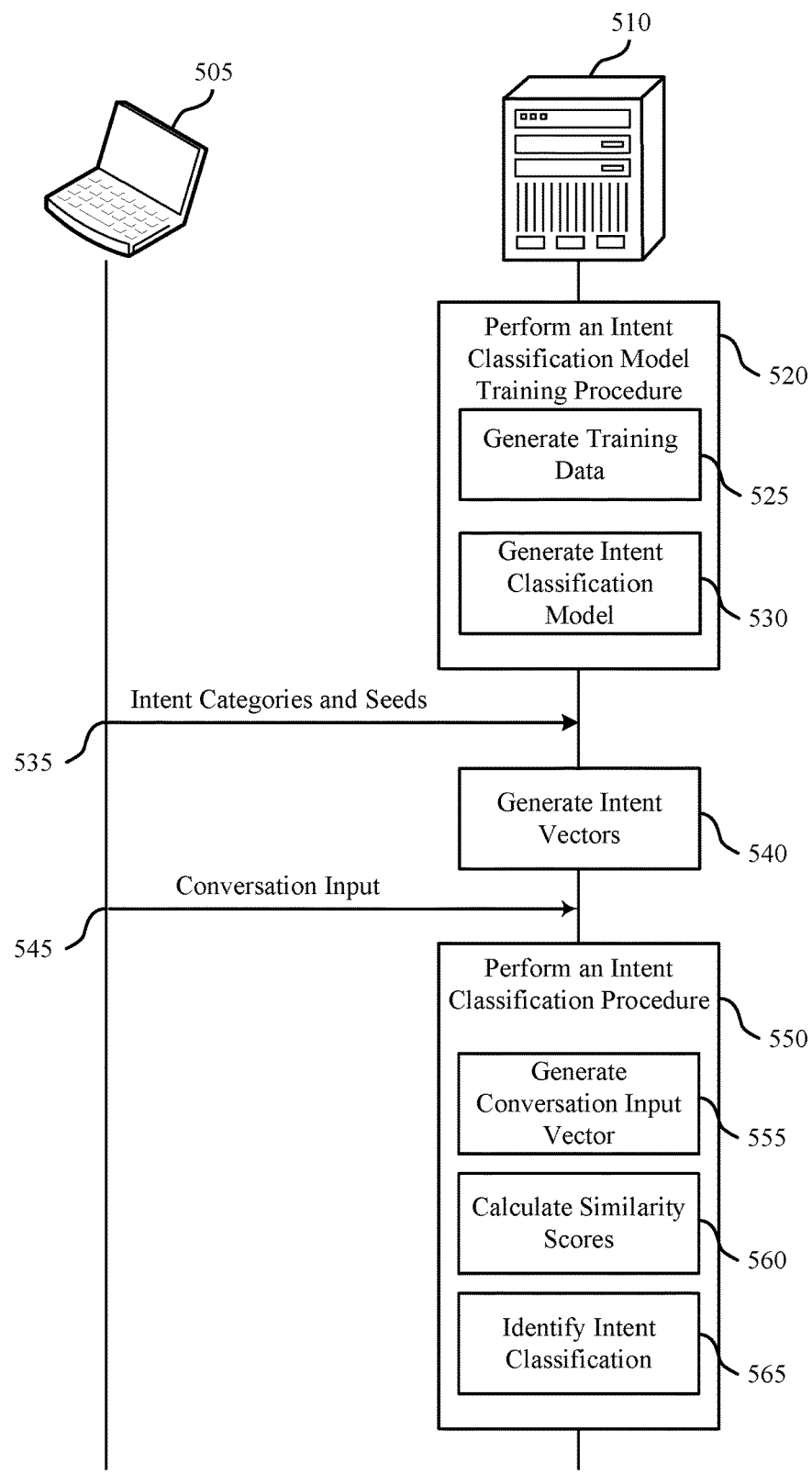
FIG. 5 illustrates an example of a data flow diagram that supports intent classification in accordance with aspects of the present disclosure.

FIG. 5 illustrates an example of a data flow diagram 500 that supports intent classification in accordance with aspects of the present disclosure. The data flow diagram 500 includes a device 505, which may be an example of a cloud client 105 of FIG. 1, and a data processing system 510, which may be an example of the intent classification model 220 of FIG. 2. At 520, the data processing system 510 performs an intent classification model training procedure. The intent classification model training procedure may be performed on a corpus of conversation data, which may be received from the device 505 (e.g., a cloud client 105). The intent classification model training procedure may include generating training data at 525. Generation of training data includes generation of a set of context-response pairs and a label corresponding to each context-response pair of the set. To generate a set of context-response pairs, the data processing system 510 selects a context (e.g., a user input) and a response (e.g., an agent or bot input) for each pair. If the context and the response of a pair are selected from the same conversation session, then a label corresponding to the context-response pair is assigned a first value (e.g., "1,"

which indicates that the pair is true). If the context and the response are selected from different conversation sessions (e.g., the response is randomly selected from the corpus), then the label corresponding to the context-response pairs is assigned a second value (e.g., "0," which indicates that the pair is false). The data processing system 510 may generate a plurality of context-response pairs, as described herein.

At 530, the data processing system 510 generates the intent classification model by training the intent classification model on the set of context response pairs. Generation of the model includes generating context vectors for each context and response vectors for each response for the set of context response pairs, comparing the context vector with the response vector for each context-response pair to calculate a similarity score, and calculating or determining the loss using the label and the similarity score for each context-response pair. The loss is utilized to train the model as the data is processed.

At 535, the device 535 transmits a set of intent categories and intent seed inputs corresponding to each intent category to the data processing system 510. A cloud client 105 may select the intent categories and seeds. At 540, the data processing system generates intent vectors for each intent of the set of intents. The intent vectors are generated using the trained intent classification model.

At 545, the data processing system 510 receives a conversation input from the device 505. The conversation input may be received from an interactive conversation service application executing at the device 505, from another instance of the interactive conversation service, or from another location.

At 550, the data processing system 510 performs an intent classification procedure. The intent classification procedure may be triggered by receipt of the conversation input at 545. The intent classification procedure includes generation of a conversation input vector at 555 based on the conversation input. The conversation input vector is generated using the trained input classification model. At 560, the data processing system 510 calculates similarity scores between the conversation input vector and each vector of the set of intent vectors. At 565, the data processing system 510 identifies an intent category of the set of intent categories corresponding to the intent vector having the highest similarity score with the conversation input vector.

Figure 6:
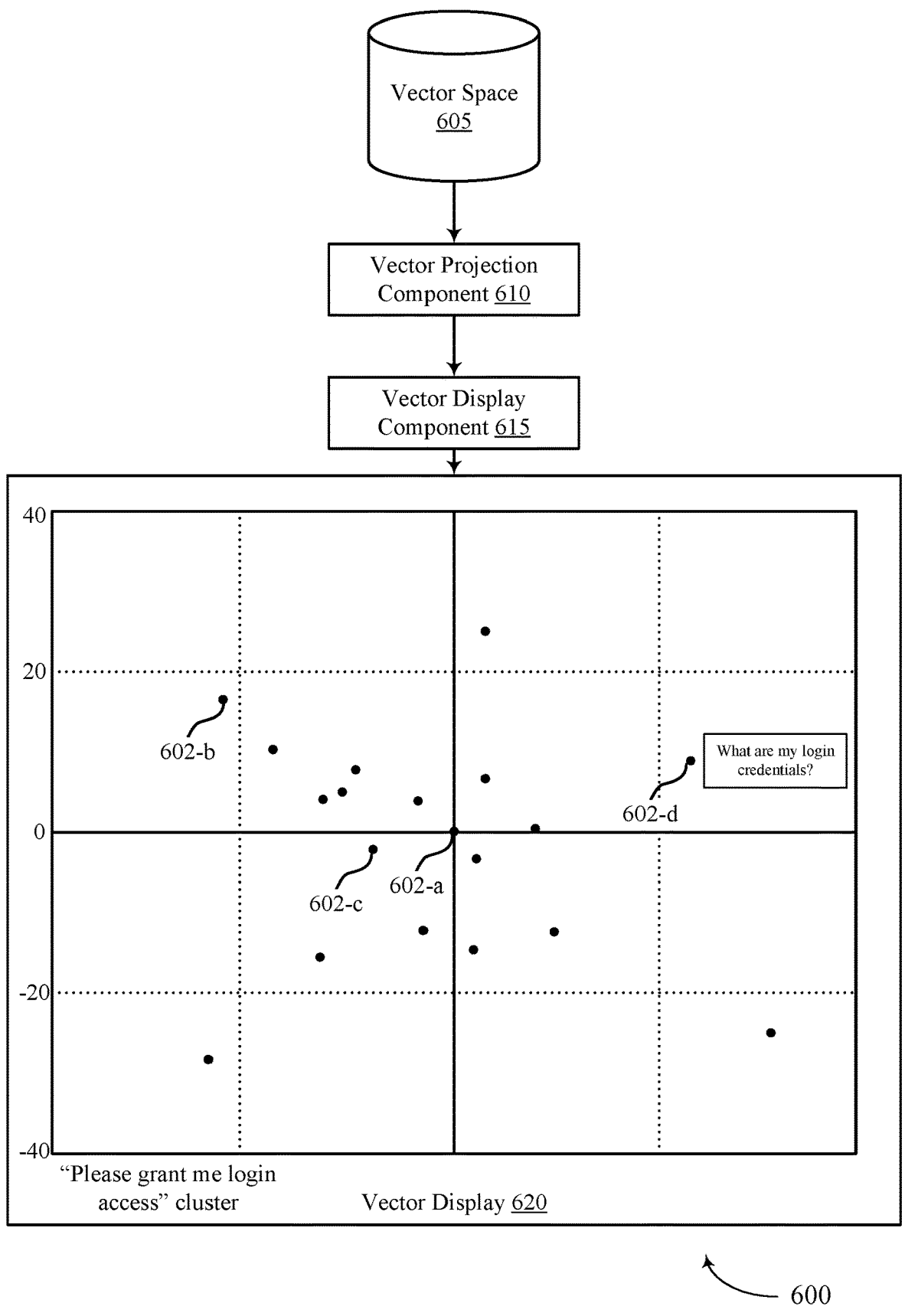
FIG. 6 illustrates an example of a user interface system that supports intent classification in accordance with aspects of the present disclosure.

FIG. 6 illustrates an example of a user interface system 600 that supports intent classification in accordance with aspects of the present disclosure. The user interface system 600 includes a vector space 605, a vector projection component 610, a vector display component 615, and a vector display 620. The vector space 605 is a data store including a plurality of words mapped to vectors including real numbers. The vectors may be multi-dimensional vectors that include many dimensions, such as fifty to hundreds of dimensions. The vectors of the vector space 605 are generated using the intent classification model (e.g., word embedding component) described herein and may be based on a corpus of historical conversation data, data collected using the intent classification model, and live conversation data.

The vector projection component 610 projects high-dimensional vectors (e.g., vectors of the vector space 605) into two-dimensional vectors. The vector display component 615 generates rendering instructions for displaying the vectors in the vector display 620. The vector display component 615 may receive selections or instructions from a user to display vectors or a subset of vectors. The vector display 620 includes a two-dimensional representation of the vectors, which are displayed as plot points 602. In some examples, the vector display is centered on a plot point 602-a, which is a vector representation of the input "please let me login." The cluster of plot points includes vectors based on inputs that are similar to the "please let me login" input. A vector represented by plot point 602-c is more similar to the "please let me login" vector plot point 602-a than the vector represented by the plot point 602-b based on the distance between the plot points 602.

In some cases, the plot points 602 may be color coded to represent agent inputs or user inputs. In some cases, the plot points 602 may be shaded based on a sentiment score, which is calculated using the user inputs. The vector display 620 may include buttons or selectors for selecting different display features. The vector display component 615 receives such inputs and generates the vector display 620. A user may mouse over a plot point 602, and the user input corresponding to the plot point may be displayed. For example, a mouse over plot point 602-d might trigger a display of "What are my login credentials?" In some cases, a user might click a plot point, and a conversation including the input corresponding to the plot may be displayed. In some cases, a user may be able to select a threshold level of similarity to increase or decrease the density of displayed plot points 602.

In some cases, the vector projection component 610 may project the multi-dimensional vectors into single dimensional vectors. In such cases, the vectors for a user input may be plotted against the vectors for an immediate agent response. Such a plot illustrates trends in user inputs and agent inputs. An administrator of a cloud client 105 may utilize the user interface system 600 as a visualization tool for many different chat instances.

Figure 7:
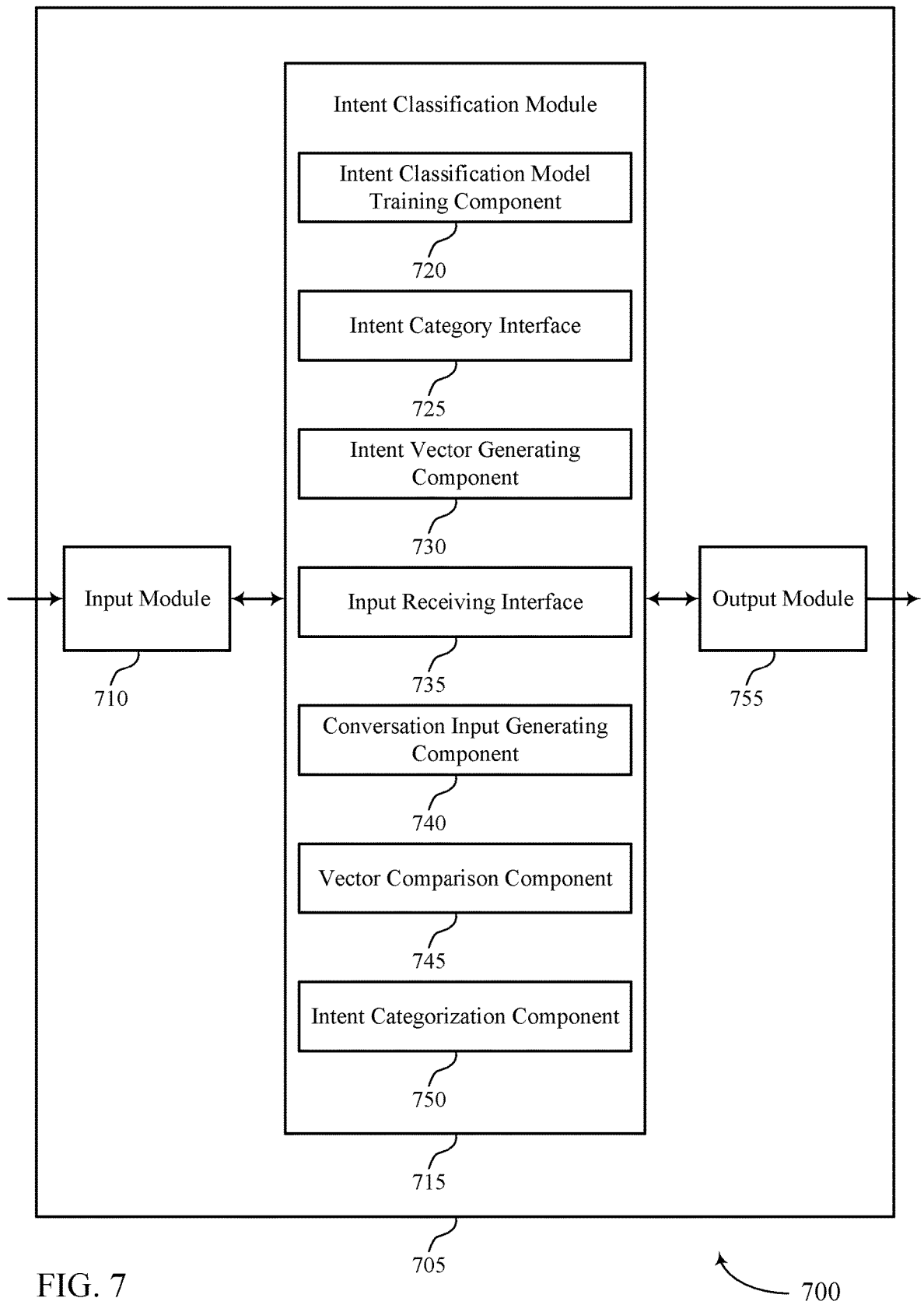
FIG. 7 shows a block diagram of an apparatus that supports intent classification in accordance with aspects of the present disclosure.

FIG. 7 shows a block diagram 700 of an apparatus 705 that supports intent classification in accordance with aspects of the present disclosure. The apparatus 705 may include an input module 710, an intent classification module 715, and an output module 755. The apparatus 705 may also include a processor. Each of these components may be in communication with one another (e.g., via one or more buses). In some cases, the apparatus 705 may be an example of a user terminal, a database server, or a system containing multiple computing devices.

The input module 710 may manage input signals for the apparatus 705. For example, the input module 710 may identify input signals based on an interaction with a modem, a keyboard, a mouse, a touchscreen, or a similar device. These input signals may be associated with user input or processing at other components or devices. In some cases, the input module 710 may utilize an operating system such as iOS®, ANDROID®, MS-DOS®, MS-WINDOWS®, OS/2®, UNIX®, LINUX®, or another known operating system to handle input signals. The input module 710 may send aspects of these input signals to other components of the apparatus 705 for processing. For example, the input module 710 may transmit input signals to the intent classification module 715 to support intent classification system. In some cases, the input module 710 may be a component of an input/output (I/O) controller 915 as described with reference to FIG. 9.

The intent classification module 715 may include an intent classification model training component 720, an intent category interface 725, an intent vector generating component 730, an input receiving interface 735, a conversation input generating component 740, a vector comparison component 745, and an intent categorization component 750. The intent classification module 715 may be an example of aspects of the intent classification module 805 or 910 described with reference to FIGS. 8 and 9.

The intent classification module 715 and/or at least some of its various sub-components may be implemented in hardware, software executed by a processor, firmware, or any combination thereof. If implemented in software executed by a processor, the functions of the intent classification module 715 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The intent classification module 715 and/or at least some of its various sub-components may be physically located at various positions, including being distributed such that portions of functions are implemented at different physical locations by one or more physical devices. In some examples, the intent classification module 715 and/or at least some of its various sub-components may be a separate and distinct component in accordance with various aspects of the present disclosure. In other examples, the intent classification module 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The intent classification model training component 720 may generate, using a word embedding function, an intent classification model including a set of input vectors corresponding to a corpus of unclassified conversation data received at an interactive conversation agent.

The intent category interface 725 may receive a set of intent categories and an intent seed input for each intent category in the set of intent categories.

The intent vector generating component 730 may generate, using the word embedding function and the intent classification model, an intent vector corresponding to each intent category in the set of intent categories, where the intent vector generated for each intent category is based on the intent seed input corresponding to the respective intent category.

The input receiving interface 735 may receive a conversation input including a text string at an instance of the interactive conversation agent.

The conversation input generating component 740 may generate, using the word embedding function and the intent classification model, a conversation input vector based on the conversation input.

The vector comparison component 745 may calculate similarity scores between the conversation input vector and each intent vector corresponding to each intent category.

The intent categorization component 750 may identify an intent category of the set of intent categories corresponding to the intent vector having a highest similarity score with the conversation input vector.

The output module 755 may manage output signals for the apparatus 705. For example, the output module 755 may receive signals from other components of the apparatus 705, such as the intent classification module 715, and may transmit these signals to other components or devices. In some specific examples, the output module 755 may transmit output signals for display in a user interface, for storage in a database or data store, for further processing at a server or server cluster, or for any other processes at any number of devices or systems. In some cases, the output module 755 may be a component of an I/O controller 915 as described with reference to FIG. 9.

Figure 8:
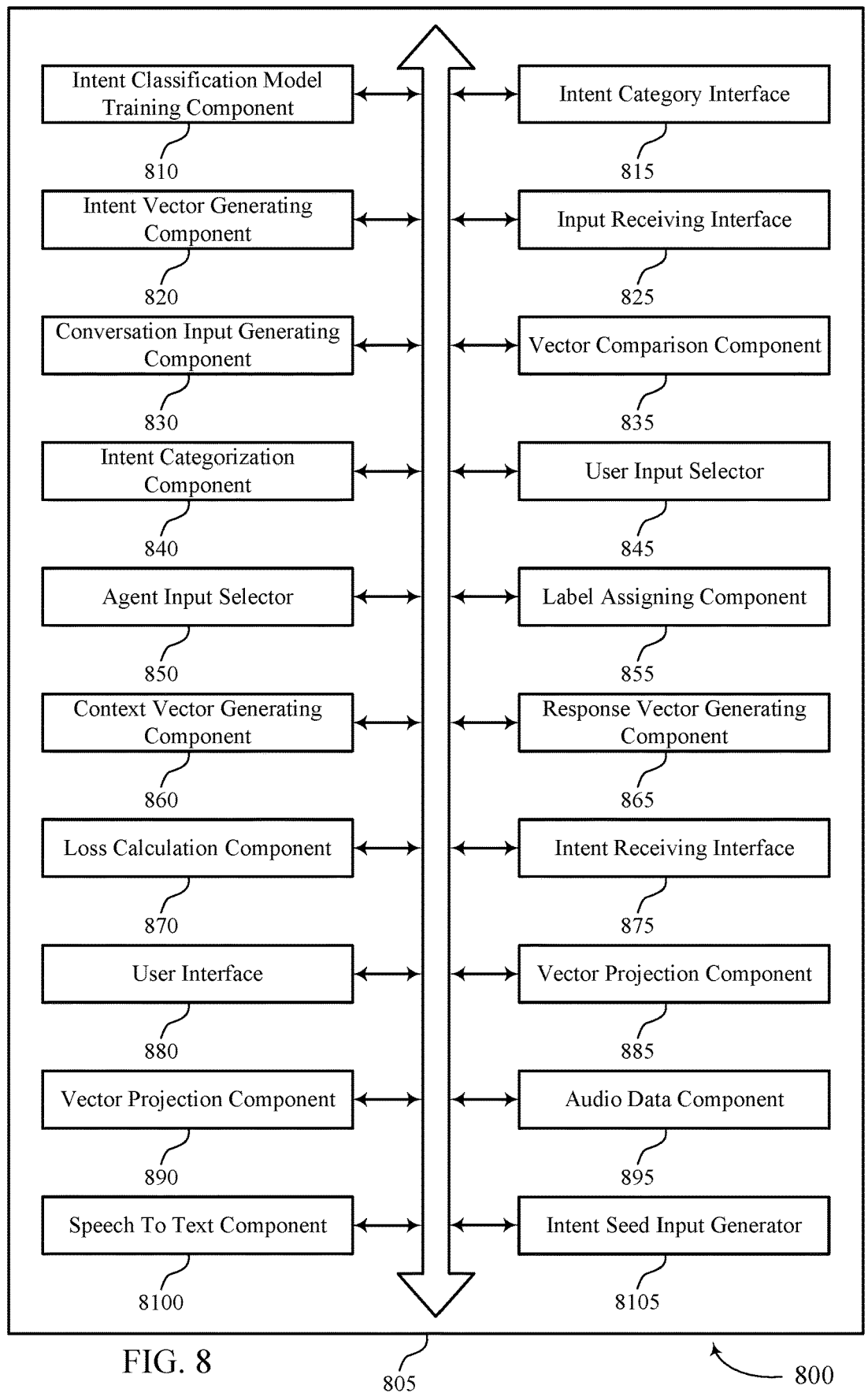
FIG. 8 shows a block diagram of a intent classification module that supports intent classification in accordance with aspects of the present disclosure.

FIG. 8 shows a block diagram 800 of a intent classification module 805 that supports intent classification in accordance with aspects of the present disclosure. The intent classification module 805 may be an example of aspects of a intent classification module 715 or a intent classification module 910 described herein. The intent classification module 805 may include an intent classification model training component 810, an intent category interface 815, an intent vector generating component 820, an input receiving interface 825, a conversation input generating component 830, a vector comparison component 835, an intent categorization component 840, an user input selector 845, an agent input selector 850, a label assigning component 855, a context vector generating component 860, a response vector generating component 865, a loss calculation component 870, an intent receiving interface 875, an user interface 880, a vector projection component 885, a vector projection component 890, an audio data component 895, a speech to text component 8100, and an intent seed input generator 8105. Each of these modules may communicate, directly or indirectly, with one another (e.g., via one or more buses).

The intent classification model training component 810 may generate, using a word embedding function, an intent classification model including a set of input vectors corresponding to a corpus of unclassified conversation data received at an interactive conversation agent.

In some examples, the intent classification model training component 810 may train the intent classification model on the set of context-response pairs.

The intent category interface 815 may receive a set of intent categories and an intent seed input for each intent category in the set of intent categories.

The intent vector generating component 820 may generate, using the word embedding function and the intent classification model, an intent vector corresponding to each intent category in the set of intent categories, where the intent vector generated for each intent category is based on the intent seed input corresponding to the respective intent category.

In some examples, the intent vector generating component 820 may generate, using the word embedding function and the intent classification model, an additional intent vector based on the additional seed input.

The input receiving interface 825 may receive a conversation input including a text string at an instance of the interactive conversation agent.

In some examples, the input receiving interface 825 may receive an additional conversation input at the interactive conversation agent.

The conversation input generating component 830 may generate, using the word embedding function and the intent classification model, a conversation input vector based on the conversation input.

In some examples, the conversation input generating component 830 may generate, using the word embedding function and the intent classification model, an additional conversation input vector.

The vector comparison component 835 may calculate similarity scores between the conversation input vector and each intent vector corresponding to each intent category.

In some examples, the vector comparison component 835 may calculate similarity scores for each context-response pair of the set of context-response pairs by comparing the context vector and the response vector of each context-response pair.

In some examples, the vector comparison component 835 may calculate similarity scores between the additional conversation input vector and each intent vector corresponding to each intent category and the additional intent vector corresponding to the additional category.

In some examples, the vector comparison component 835 may identify the intent vector based on a nearest neighbor technique.

The intent categorization component 840 may identify an intent category of the set of intent categories corresponding to the intent vector having a highest similarity score with the conversation input vector.

In some examples, the intent categorization component 840 may identify an intent category of the set of intent categories and the additional intent category corresponding to an intent vector or the additional intent vector having a highest similarity score with the additional conversation input vector.

The user input selector 845 may select a user input from the corpus of conversation data as a context for a context-response pair for a set of context-response pairs.

The agent input selector 850 may select an agent input from the corpus of conversation data as a response for the context-response pair.

The label assigning component 855 may assign a first value to a label corresponding to the context-response pair based at least in part on the user input and the agent input being selected from within a window in a same conversation session of the corpus of conversation data, the window defining a number of sequential inputs in the same conversation session. In some cases, the label assigning component 855 may assign a first value to the label corresponding to the context-response pair based at least in part on the user input and the agent input being selected from the same conversation session of the corpus of conversation data (e.g., without regard to the window).

In some examples, the label assigning component 855 may assign a second value to the label corresponding to the context-response pair based at least in part on one of the user input and the agent input being selected from different conversation sessions of the corpus of conversation data and the user input and the agent input being selected outside the window in the same conversation session. In some cases, the label assigning component 855 may assign a second value to the label corresponding to the context-response pair based at least in part on the user input and the agent input being selected from different conversation sessions of the corpus of conversation data (e.g., without regard to the window).

The context vector generating component 860 may generate a context vector for each context of the set of context-response pairs.

The response vector generating component 865 may generate a response vector for each response of the set of context-response pairs.

The loss calculation component 870 may determine a loss for each context-response pair of the set of context-response pairs based at least on the similarity score and the label corresponding to each context-response pair of the set of context-response pairs.

The intent receiving interface 875 may receive an additional intent category and additional seed input corresponding to the additional intent category.

The user interface 880 may display the set of input vectors of the intent classification model on a user interface of a user device.

In some examples, the user interface 880 may display the graph at the user interface of the user device.

The vector projection component 885 may project high dimensional input vectors into two-dimensional vectors.

The vector projection component 890 may plot the two-dimensional vectors on a graph.

The audio data component 895 may receive audio data including voice data at the interactive conversation agent.

The speech to text component 8100 may convert the audio data into the conversation input including the text string.

The intent seed input generator 8105 may separate the set of input vectors into set of clusters based on distance score calculation between each of the set of input vectors.

In some examples, the intent seed input generator 8105 may select at least one input vector from each cluster of the set of clusters, each of the selected input vectors corresponding to a suggested intent seed input, where one or more of the at least one intent seed input for each intent category in the set of intent categories are selected from the suggested intent seed inputs. In some cases, the suggested intent seed inputs are recommended to a user by transmitting an indication of each of the suggested intent seed inputs to a user device, wherein one or more of the at least one intent seed input for each intent category in the set of intent categories are selected from the suggested intent seed inputs at the user device.

Figure 9:
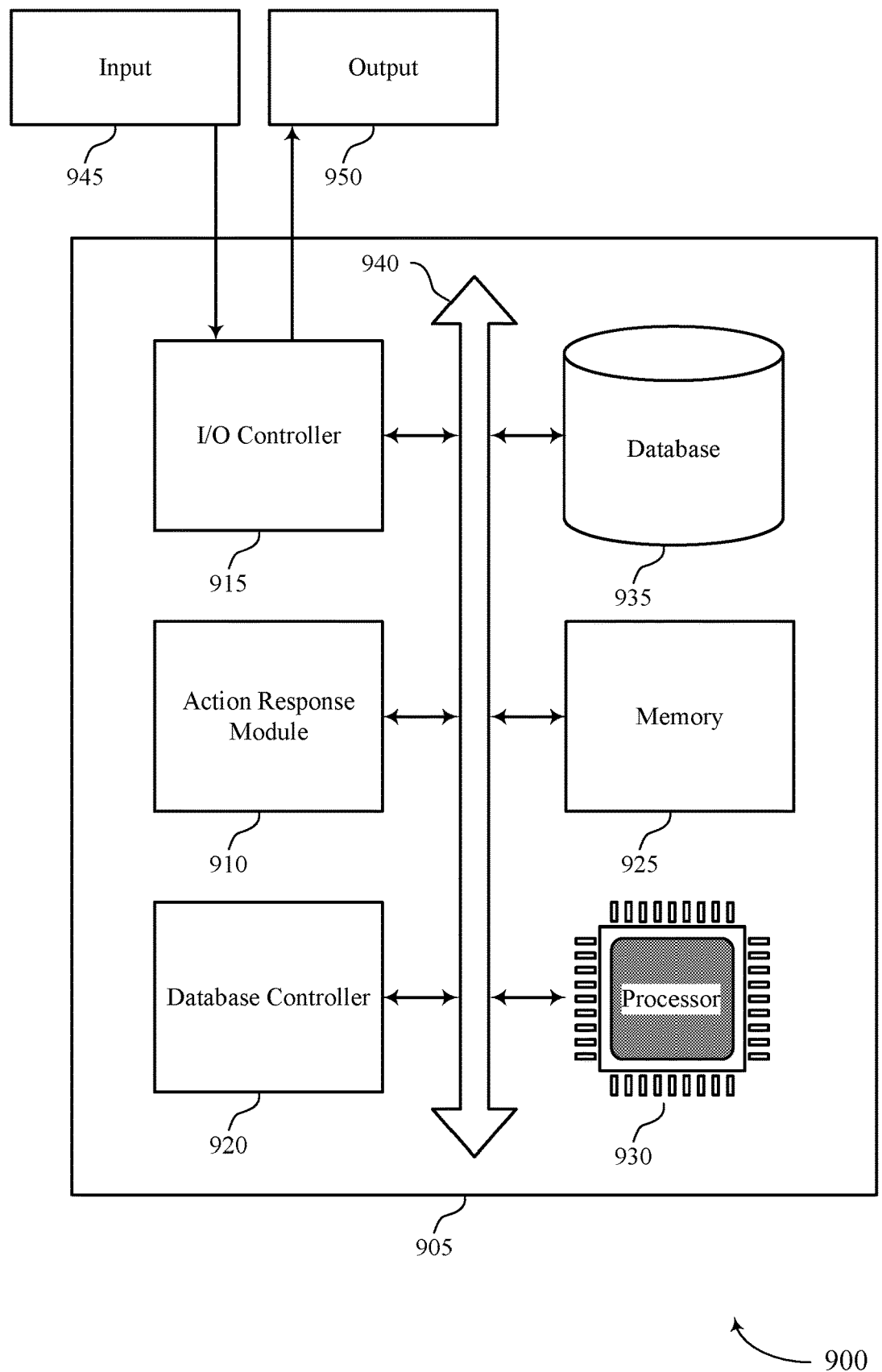
FIG. 9 shows a diagram of a system including a device that supports intent classification in accordance with aspects of the present disclosure.

FIG. 9 shows a diagram of a system 900 including a device 905 that supports intent classification in accordance with aspects of the present disclosure. The device 905 may be an example of or include the components of an analytical data store or an apparatus 705 as described herein. The device 905 may include components for bi-directional data communications including components for transmitting and receiving communications, including an intent classification module 910, an I/O controller 915, a database controller 920, memory 925, a processor 930, and a database 935. These components may be in electronic communication via one or more buses (e.g., bus 940).

The intent classification module 910 may be an example of a intent classification module 715 or 805 as described herein. For example, the intent classification module 910 may perform any of the methods or processes described herein with reference to FIGS. 7 and 8. In some cases, the intent classification module 910 may be implemented in hardware, software executed by a processor, firmware, or any combination thereof.

The I/O controller 915 may manage input signals 945 and output signals 950 for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The database controller 920 may manage data storage and processing in a database 935. In some cases, a user may interact with the database controller 920. In other cases, the database controller 920 may operate automatically without user interaction. The database 935 may be an example of a single database, a distributed database, multiple distributed databases, a data store, a data lake, or an emergency backup database.

Memory 925 may include random-access memory (RAM) and read-only memory (ROM). The memory 925 may store computer-readable, computer-executable software including instructions that, when executed, cause the processor to perform various functions described herein. In some cases, the memory 925 may contain, among other things, a basic input/output system (BIOS) which may control basic hardware or software operation such as the interaction with peripheral components or devices.

The processor 930 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in a memory 925 to perform various functions (e.g., functions or tasks supporting intent classification system).

Figure 10:
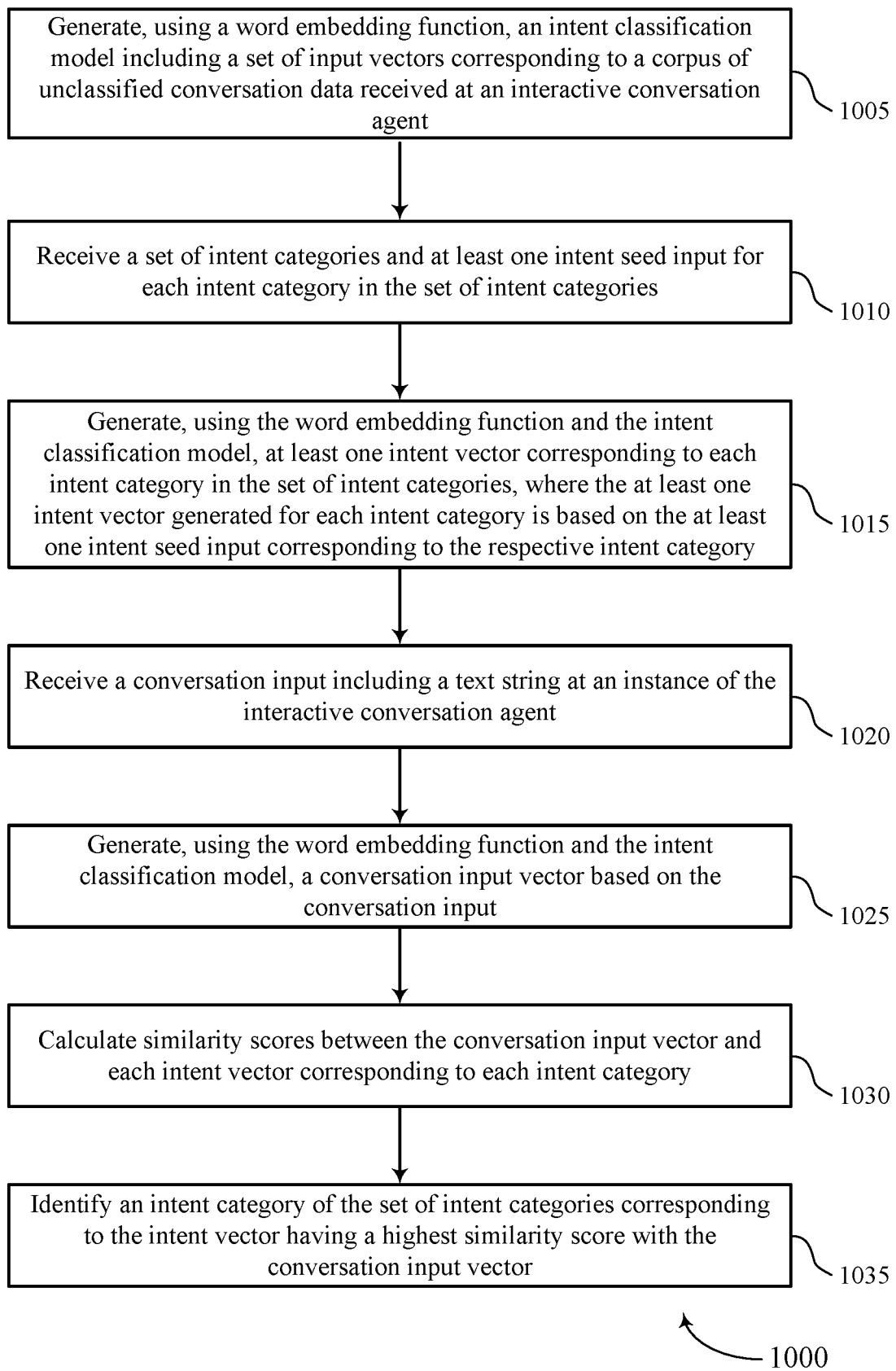
FIGS. 10 through 15 show flowcharts illustrating methods that support intent classification system in accordance with aspects of the present disclosure.

FIG. 10 shows a flowchart illustrating a method 1000 that supports intent classification in accordance with aspects of the present disclosure. The operations of method 1000 may be implemented by an analytical data store or its components as described herein. For example, the operations of method 1000 may be performed by a intent classification module as described with reference to FIGS. 7 through 9. In some examples, an analytical data store may execute a set of instructions to control the functional elements of the analytical data store to perform the functions described herein. Additionally or alternatively, an analytical data store may perform aspects of the functions described herein using special-purpose hardware.

At 1005, the analytical data store may generate, using a word embedding function, an intent classification model including a set of input vectors corresponding to a corpus of unclassified conversation data received at an interactive conversation agent. The operations of 1005 may be performed according to the methods described herein. In some examples, aspects of the operations of 1005 may be performed by an intent classification model training component as described with reference to FIGS. 7 through 9.

At 1010, the analytical data store may receive a set of intent categories and at least one intent seed input for each intent category in the set of intent categories. The operations of 1010 may be performed according to the methods described herein. In some examples, aspects of the operations of 1010 may be performed by an intent category interface as described with reference to FIGS. 7 through 9.

At 1015, the analytical data store may generate, using the word embedding function and the intent classification model, at least one intent vector corresponding to each intent category in the set of intent categories, where the intent vector generated for each intent category is based on the at least one intent seed input corresponding to the respective intent category. The operations of 1015 may be performed according to the methods described herein. In some examples, aspects of the operations of 1015 may be performed by an intent vector generating component as described with reference to FIGS. 7 through 9.

At 1020, the analytical data store may receive a conversation input including a text string at an instance of the interactive conversation agent. The operations of 1020 may be performed according to the methods described herein. In some examples, aspects of the operations of 1020 may be performed by an input receiving interface as described with reference to FIGS. 7 through 9.

At 1025, the analytical data store may generate, using the word embedding function and the intent classification model, a conversation input vector based on the conversation input. The operations of 1025 may be performed according to the methods described herein. In some examples, aspects of the operations of 1025 may be performed by a conversation input generating component as described with reference to FIGS. 7 through 9.

At 1030, the analytical data store may calculate similarity scores between the conversation input vector and each intent vector corresponding to each intent category. The operations of 1030 may be performed according to the methods described herein. In some examples, aspects of the operations of 1030 may be performed by a vector comparison component as described with reference to FIGS. 7 through 9.

At 1035, the analytical data store may identify an intent category of the set of intent categories corresponding to the intent vector having a highest similarity score with the conversation input vector. The operations of 1035 may be performed according to the methods described herein. In some examples, aspects of the operations of 1035 may be performed by an intent categorization component as described with reference to FIGS. 7 through 9.

Figure 11:
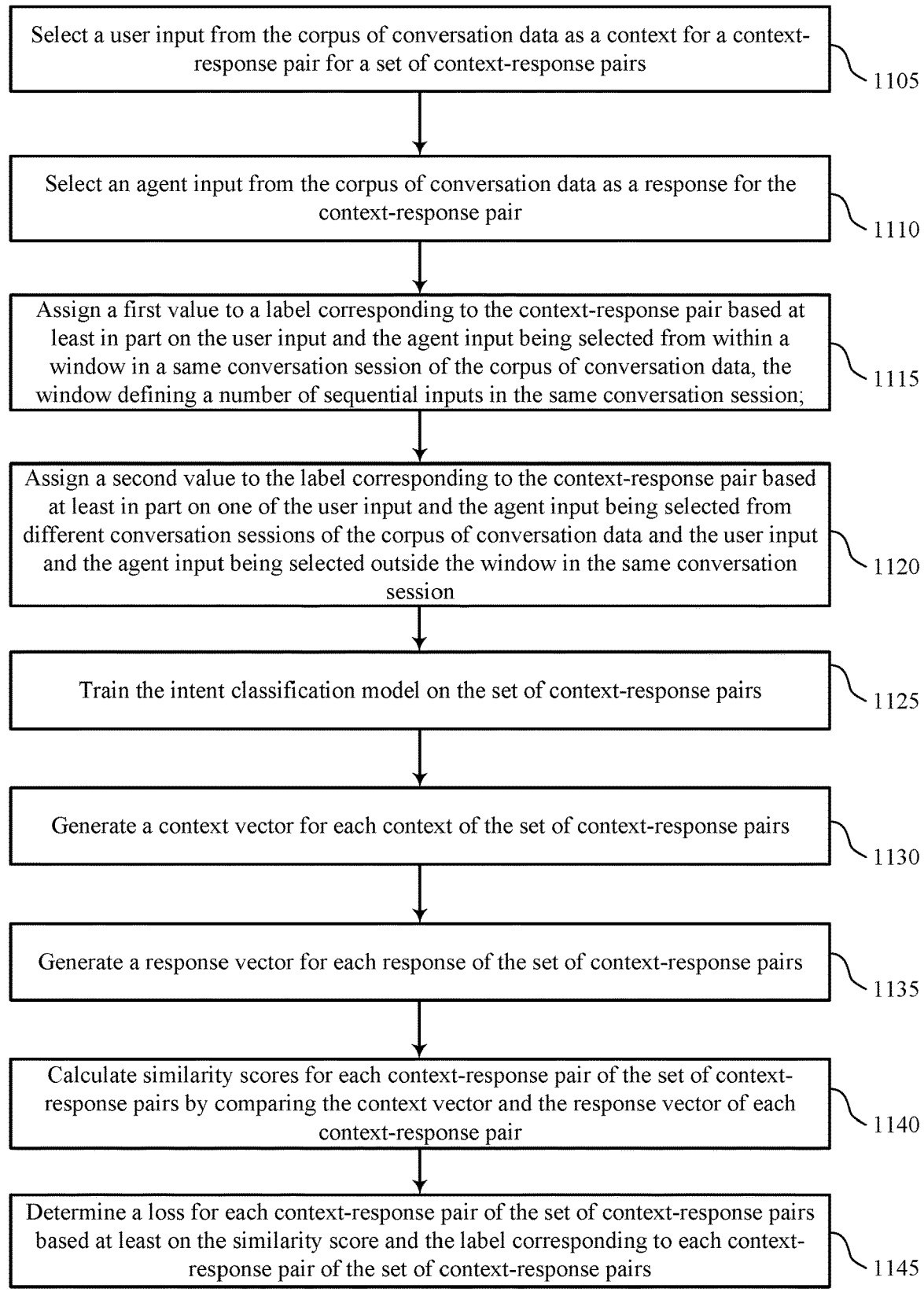

FIG. 11 shows a flowchart illustrating a method 1100 that supports intent classification in accordance with aspects of the present disclosure. Specifically, FIG. 11 illustrates a method for generating training data and training an intent classification model on the training data. The operations of method 1100 may be implemented by an analytical data store or its components as described herein. For example, the operations of method 1100 may be performed by a intent classification module as described with reference to FIGS. 7 through 9. In some examples, an analytical data store may execute a set of instructions to control the functional elements of the analytical data store to perform the functions described herein. Additionally or alternatively, an analytical data store may perform aspects of the functions described herein using special-purpose hardware.

At 1105, the analytical data store may select a user input from the corpus of conversation data as a context for a context-response pair for a set of context-response pairs. The operations of 1105 may be performed according to the methods described herein. In some examples, aspects of the operations of 1105 may be performed by an user input selector as described with reference to FIGS. 7 through 9.

At 1110, the analytical data store may select an agent input from the corpus of conversation data as a response for the context-response pair. The operations of 1110 may be performed according to the methods described herein. In some examples, aspects of the operations of 1110 may be performed by an agent input selector as described with reference to FIGS. 7 through 9.

At 1115, the analytical data store may assign a first value to a label corresponding to the context-response pair based at least in part on the user input and the agent input being selected from within a window in a same conversation session of the corpus of conversation data, the window defining a number of sequential inputs in the same conversation session. The operations of 1115 may be performed according to the methods described herein. In some examples, aspects of the operations of 1115 may be performed by a label assigning component as described with reference to FIGS. 7 through 9.

At 1120, the analytical data store may assign a second value to the label corresponding to the context-response pair based at least in part on one of the user input and the agent input being selected from different conversation sessions of the corpus of conversation data and the user input and the agent input being selected from outside the window in the same conversation session. The operations of 1120 may be performed according to the methods described herein. In some examples, aspects of the operations of 1120 may be performed by a label assigning component as described with reference to FIGS. 7 through 9.

At 1125, the analytical data store may train the intent classification model on the set of context-response pairs. The operations of 1125 may be performed according to the methods described herein. In some examples, aspects of the operations of 1125 may be performed by an intent classification model training component as described with reference to FIGS. 7 through 9.

At 1130, the analytical data store may generate a context vector for each context of the set of context-response pairs. The operations of 1130 may be performed according to the methods described herein. In some examples, aspects of the operations of 1130 may be performed by a context vector generating component as described with reference to FIGS. 7 through 9.

At 1135, the analytical data store may generate a response vector for each response of the set of context-response pairs. The operations of 1135 may be performed according to the methods described herein. In some examples, aspects of the operations of 1135 may be performed by a response vector generating component as described with reference to FIGS. 7 through 9.

At 1140, the analytical data store may calculate similarity scores for each context-response pair of the set of context-response pairs by comparing the context vector and the response vector of each context-response pair. The operations of 1140 may be performed according to the methods described herein. In some examples, aspects of the operations of 1140 may be performed by a vector comparison component as described with reference to FIGS. 7 through 9.

At 1145, the analytical data store may determine a loss for each context-response pair of the set of context-response pairs based at least on the similarity score and the label corresponding to each context-response pair of the set of context-response pairs. The operations of 1145 may be performed according to the methods described herein. In some examples, aspects of the operations of 1145 may be performed by a loss calculation component as described with reference to FIGS. 7 through 9.

Figure 12:
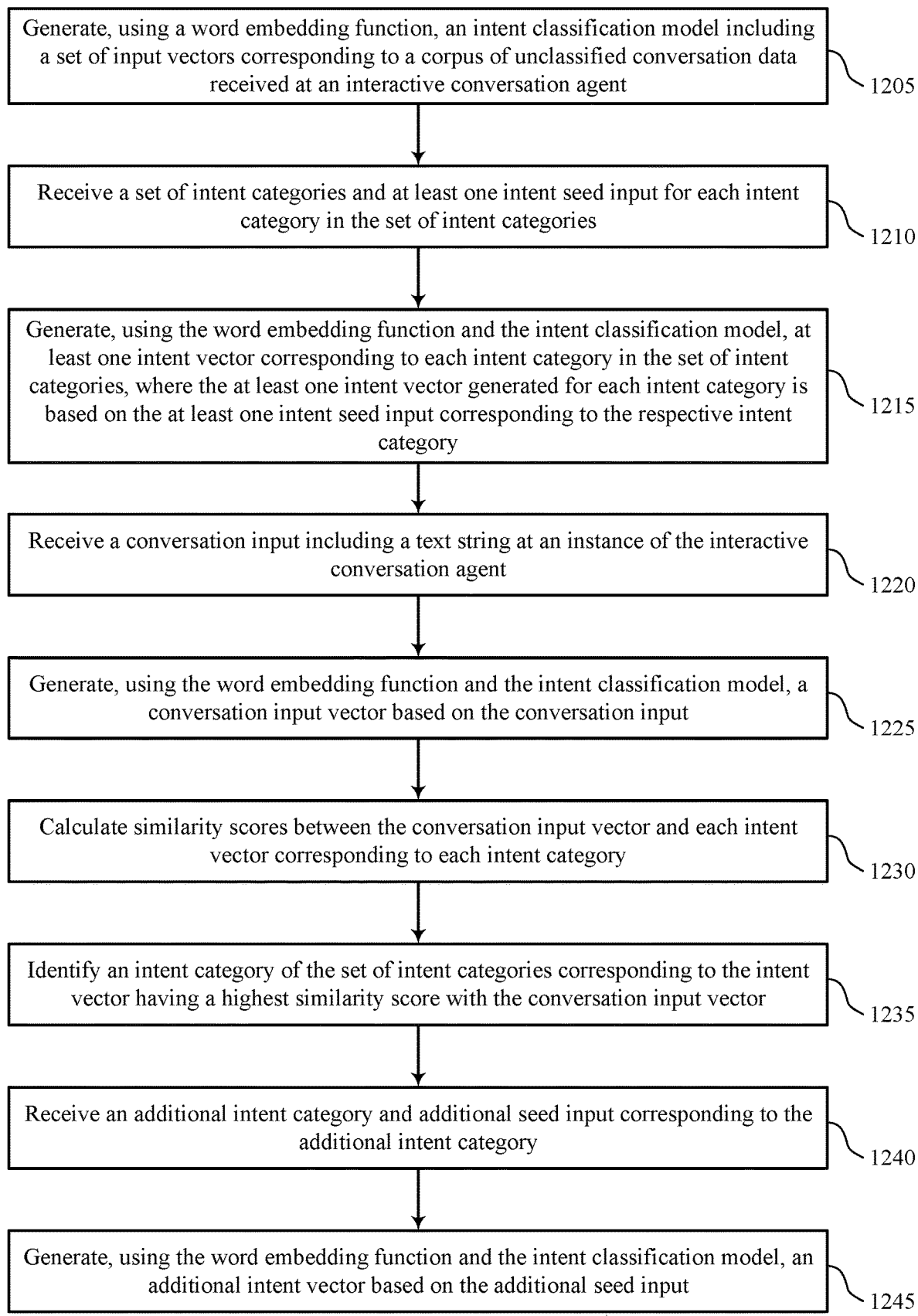

FIG. 12 shows a flowchart illustrating a method 1200 that supports intent classification in accordance with aspects of the present disclosure. The operations of method 1200 may be implemented by an analytical data store or its components as described herein. For example, the operations of method 1200 may be performed by a intent classification module as described with reference to FIGS. 7 through 9. In some examples, an analytical data store may execute a set of instructions to control the functional elements of the analytical data store to perform the functions described herein. Additionally or alternatively, an analytical data store may perform aspects of the functions described herein using special-purpose hardware.

At 1205, the analytical data store may generate, using a word embedding function, an intent classification model including a set of input vectors corresponding to a corpus of unclassified conversation data received at an interactive conversation agent. The operations of 1205 may be performed according to the methods described herein. In some examples, aspects of the operations of 1205 may be performed by an intent classification model training component as described with reference to FIGS. 7 through 9.

At 1210, the analytical data store may receive a set of intent categories and at least one intent seed input for each intent category in the set of intent categories. The operations of 1210 may be performed according to the methods described herein. In some examples, aspects of the operations of 1210 may be performed by an intent category interface as described with reference to FIGS. 7 through 9.

At 1215, the analytical data store may generate, using the word embedding function and the intent classification model, at least one intent vector corresponding to each intent category in the set of intent categories, where the at least one intent vector generated for each intent category is based on the at least one intent seed input corresponding to the respective intent category. The operations of 1215 may be performed according to the methods described herein. In some examples, aspects of the operations of 1215 may be performed by an intent vector generating component as described with reference to FIGS. 7 through 9.

At 1220, the analytical data store may receive a conversation input including a text string at an instance of the interactive conversation agent. The operations of 1220 may be performed according to the methods described herein. In some examples, aspects of the operations of 1220 may be performed by an input receiving interface as described with reference to FIGS. 7 through 9.

At 1225, the analytical data store may generate, using the word embedding function and the intent classification model, a conversation input vector based on the conversation input. The operations of 1225 may be performed according to the methods described herein. In some examples, aspects of the operations of 1225 may be performed by a conversation input generating component as described with reference to FIGS. 7 through 9.

At 1230, the analytical data store may calculate similarity scores between the conversation input vector and each intent vector corresponding to each intent category. The operations of 1230 may be performed according to the methods described herein. In some examples, aspects of the operations of 1230 may be performed by a vector comparison component as described with reference to FIGS. 7 through 9.

At 1235, the analytical data store may identify an intent category of the set of intent categories corresponding to the intent vector having a highest similarity score with the conversation input vector. The operations of 1235 may be performed according to the methods described herein. In some examples, aspects of the operations of 1235 may be performed by an intent categorization component as described with reference to FIGS. 7 through 9.

At 1240, the analytical data store may receive an additional intent category and additional seed input corresponding to the additional intent category. The operations of 1240 may be performed according to the methods described herein. In some examples, aspects of the operations of 1240 may be performed by an intent receiving interface as described with reference to FIGS. 7 through 9.

At 1245, the analytical data store may generate, using the word embedding function and the intent classification model, an additional intent vector based on the additional seed input. The operations of 1245 may be performed according to the methods described herein. In some examples, aspects of the operations of 1245 may be performed by an intent vector generating component as described with reference to FIGS. 7 through 9.

Figure 13:
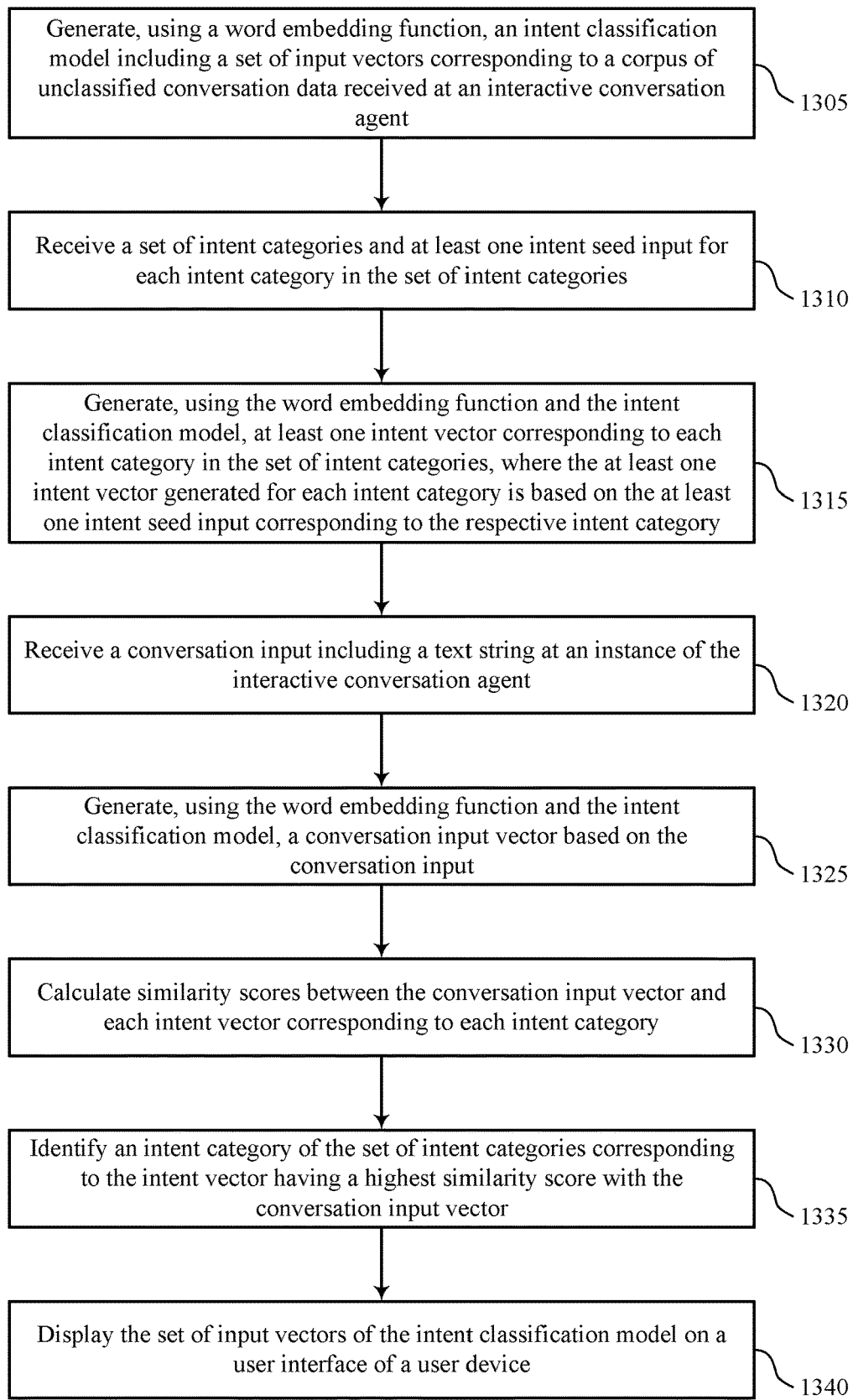

FIG. 13 shows a flowchart illustrating a method 1300 that supports intent classification in accordance with aspects of the present disclosure. The operations of method 1300 may be implemented by an analytical data store or its components as described herein. For example, the operations of method 1300 may be performed by a intent classification module as described with reference to FIGS. 7 through 9. In some examples, an analytical data store may execute a set of instructions to control the functional elements of the analytical data store to perform the functions described herein. Additionally or alternatively, an analytical data store may perform aspects of the functions described herein using special-purpose hardware.

At 1305, the analytical data store may generate, using a word embedding function, an intent classification model including a set of input vectors corresponding to a corpus of unclassified conversation data received at an interactive conversation agent. The operations of 1305 may be performed according to the methods described herein. In some examples, aspects of the operations of 1305 may be performed by an intent classification model training component as described with reference to FIGS. 7 through 9.

At 1310, the analytical data store may receive a set of intent categories and at least one intent seed input for each intent category in the set of intent categories. The operations of 1310 may be performed according to the methods described herein. In some examples, aspects of the operations of 1310 may be performed by an intent category interface as described with reference to FIGS. 7 through 9.

At 1315, the analytical data store may generate, using the word embedding function and the intent classification model, at least one intent vector corresponding to each intent category in the set of intent categories, where the at least one intent vector generated for each intent category is based on the at least one intent seed input corresponding to the respective intent category. The operations of 1315 may be performed according to the methods described herein. In some examples, aspects of the operations of 1315 may be performed by an intent vector generating component as described with reference to FIGS. 7 through 9.

At 1320, the analytical data store may receive a conversation input including a text string at an instance of the interactive conversation agent. The operations of 1320 may be performed according to the methods described herein. In some examples, aspects of the operations of 1320 may be performed by an input receiving interface as described with reference to FIGS. 7 through 9.

At 1325, the analytical data store may generate, using the word embedding function and the intent classification model, a conversation input vector based on the conversation input. The operations of 1325 may be performed according to the methods described herein. In some examples, aspects of the operations of 1325 may be performed by a conversation input generating component as described with reference to FIGS. 7 through 9.

At 1330, the analytical data store may calculate similarity scores between the conversation input vector and each intent vector corresponding to each intent category. The operations of 1330 may be performed according to the methods described herein. In some examples, aspects of the operations of 1330 may be performed by a vector comparison component as described with reference to FIGS. 7 through 9.

At 1335, the analytical data store may identify an intent category of the set of intent categories corresponding to the intent vector having a highest similarity score with the conversation input vector. The operations of 1335 may be performed according to the methods described herein. In some examples, aspects of the operations of 1335 may be performed by an intent categorization component as described with reference to FIGS. 7 through 9.

At 1340, the analytical data store may display the set of input vectors of the intent classification model on a user interface of a user device. The operations of 1340 may be performed according to the methods described herein. In some examples, aspects of the operations of 1340 may be performed by an user interface as described with reference to FIGS. 7 through 9.

Figure 14:
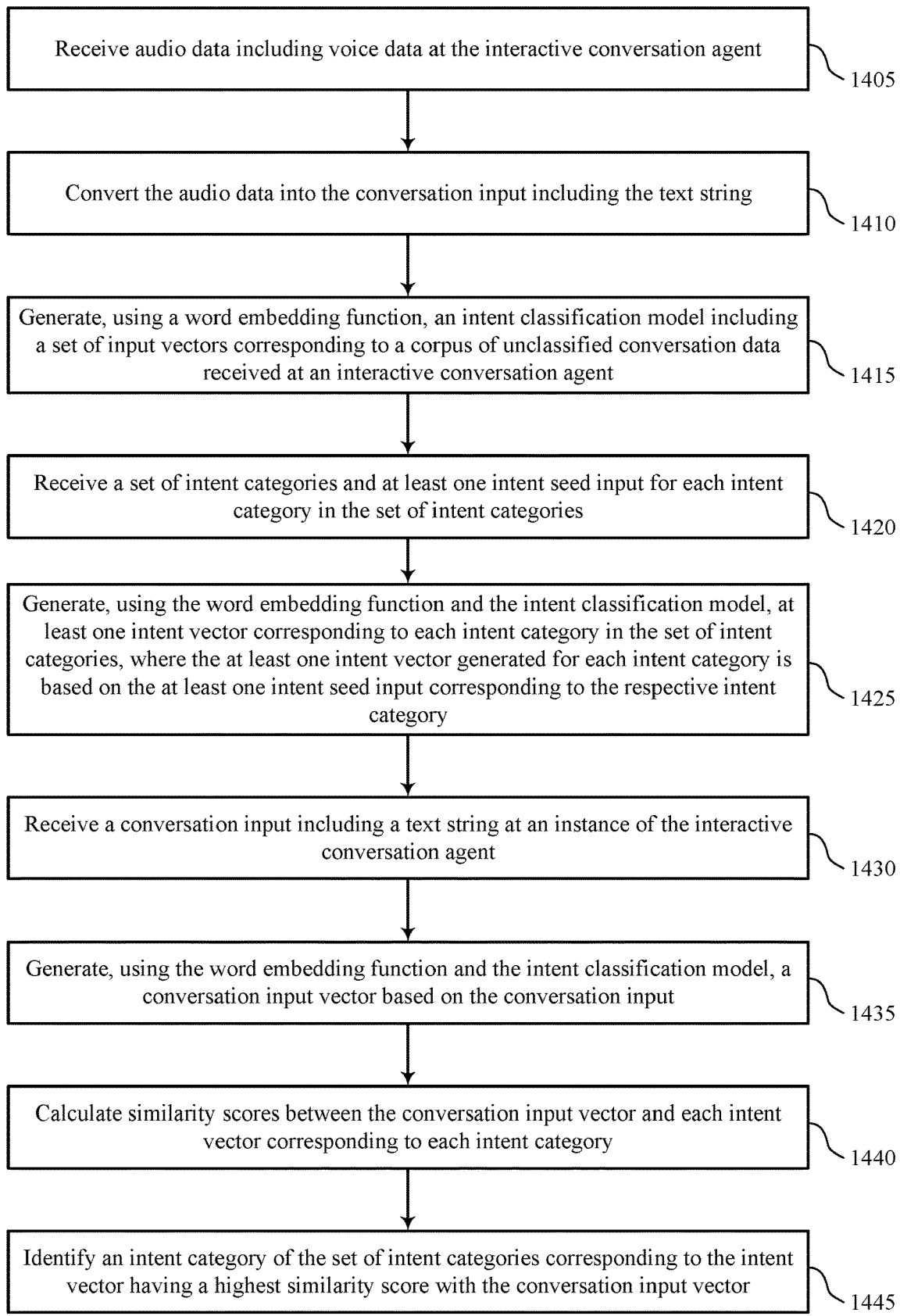

FIG. 14 shows a flowchart illustrating a method 1400 that supports intent classification in accordance with aspects of the present disclosure. The operations of method 1400 may be implemented by an analytical data store or its components as described herein. For example, the operations of method 1400 may be performed by a intent classification module as described with reference to FIGS. 7 through 9. In some examples, an analytical data store may execute a set of instructions to control the functional elements of the analytical data store to perform the functions described herein. Additionally or alternatively, an analytical data store may perform aspects of the functions described herein using special-purpose hardware.

At 1405, the analytical data store may receive audio data including voice data at the interactive conversation agent. The operations of 1405 may be performed according to the methods described herein. In some examples, aspects of the operations of 1405 may be performed by an audio data component as described with reference to FIGS. 7 through 9.

At 1410, the analytical data store may convert the audio data into the conversation input including the text string. The operations of 1410 may be performed according to the methods described herein. In some examples, aspects of the operations of 1410 may be performed by a speech to text component as described with reference to FIGS. 7 through 9.

At 1415, the analytical data store may generate, using a word embedding function, an intent classification model including a set of input vectors corresponding to a corpus of unclassified conversation data received at an interactive conversation agent. The operations of 1415 may be performed according to the methods described herein. In some examples, aspects of the operations of 1415 may be performed by an intent classification model training component as described with reference to FIGS. 7 through 9.

At 1420, the analytical data store may receive a set of intent categories and at least one intent seed input for each intent category in the set of intent categories. The operations of 1420 may be performed according to the methods described herein. In some examples, aspects of the operations of 1420 may be performed by an intent category interface as described with reference to FIGS. 7 through 9.

At 1425, the analytical data store may generate, using the word embedding function and the intent classification model, at least one intent vector corresponding to each intent category in the set of intent categories, where the at least one intent vector generated for each intent category is based on the at least one intent seed input corresponding to the respective intent category. The operations of 1425 may be performed according to the methods described herein. In some examples, aspects of the operations of 1425 may be performed by an intent vector generating component as described with reference to FIGS. 7 through 9.

At 1430, the analytical data store may receive a conversation input including a text string at an instance of the interactive conversation agent. The operations of 1430 may be performed according to the methods described herein. In some examples, aspects of the operations of 1430 may be performed by an input receiving interface as described with reference to FIGS. 7 through 9.

At 1435, the analytical data store may generate, using the word embedding function and the intent classification model, a conversation input vector based on the conversation input. The operations of 1435 may be performed according to the methods described herein. In some examples, aspects of the operations of 1435 may be performed by a conversation input generating component as described with reference to FIGS. 7 through 9.

At 1440, the analytical data store may calculate similarity scores between the conversation input vector and each intent vector corresponding to each intent category. The operations of 1440 may be performed according to the methods described herein. In some examples, aspects of the operations of 1440 may be performed by a vector comparison component as described with reference to FIGS. 7 through 9.

At 1445, the analytical data store may identify an intent category of the set of intent categories corresponding to the intent vector having a highest similarity score with the conversation input vector. The operations of 1445 may be performed according to the methods described herein. In some examples, aspects of the operations of 1445 may be performed by an intent categorization component as described with reference to FIGS. 7 through 9.

Figure 15:
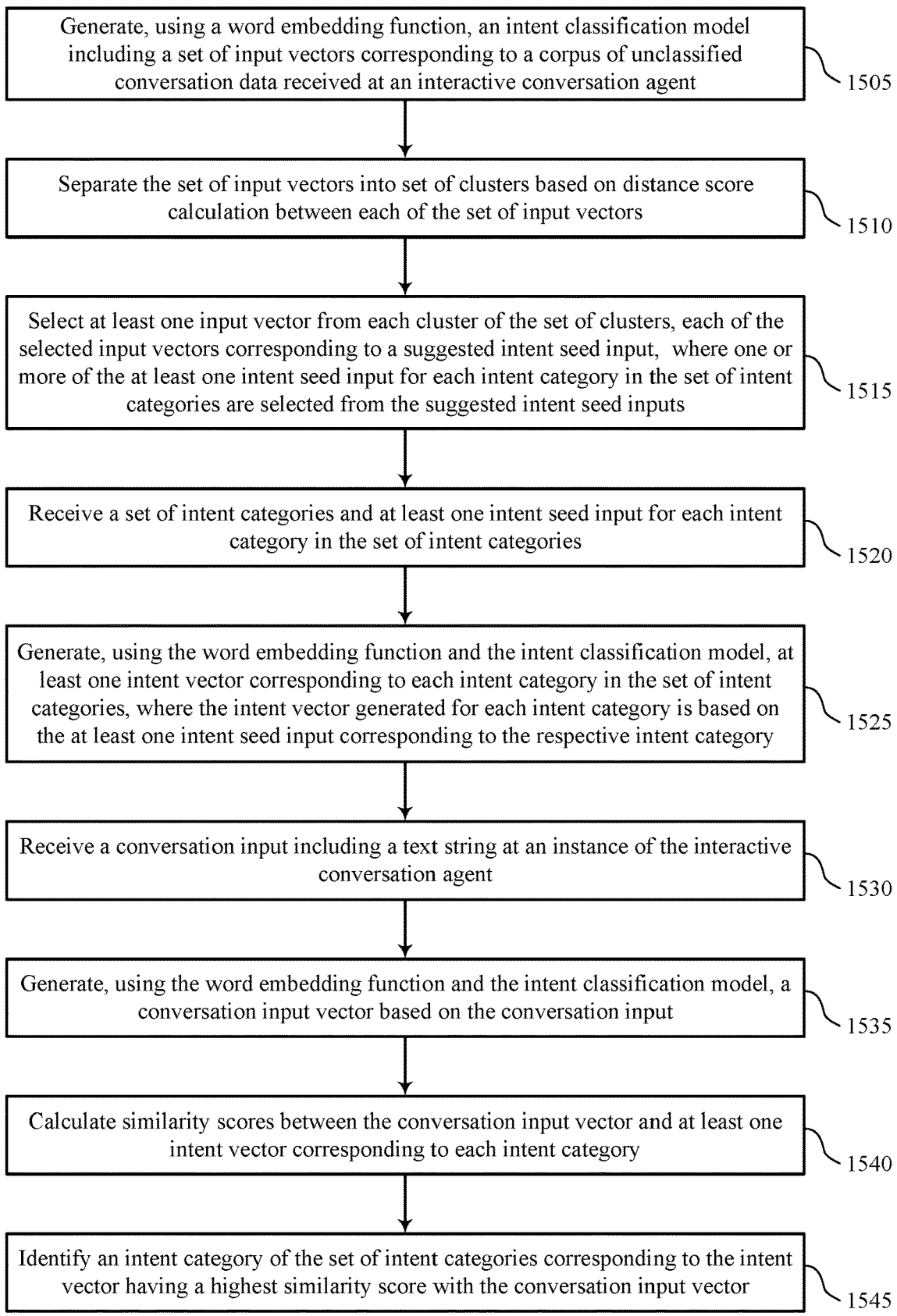

FIG. 15 shows a flowchart illustrating a method 1500 that supports intent classification system in accordance with aspects of the present disclosure. The operations of method 1500 may be implemented by an analytical data store or its components as described herein. For example, the operations of method 1500 may be performed by a intent classification module as described with reference to FIGS. 7 through 9. In some examples, an analytical data store may execute a set of instructions to control the functional elements of the analytical data store to perform the functions described herein. Additionally or alternatively, an analytical data store may perform aspects of the functions described herein using special-purpose hardware.

At 1505, the analytical data store may generate, using a word embedding function, an intent classification model including a set of input vectors corresponding to a corpus of unclassified conversation data received at an interactive conversation agent. The operations of 1505 may be performed according to the methods described herein. In some examples, aspects of the operations of 1505 may be performed by an intent classification model training component as described with reference to FIGS. 7 through 9.

At 1510, the analytical data store may separate the set of input vectors into set of clusters based on distance score calculation between each of the set of input vectors. The operations of 1510 may be performed according to the methods described herein. In some examples, aspects of the operations of 1510 may be performed by an intent seed input generator as described with reference to FIG. 8.

At 1515, the analytical data store may select at least one input vector from each cluster of the set of clusters, each of the selected input vectors corresponding to a suggested intent seed input, where one or more of the at least one intent seed input for each intent category in the set of intent categories are selected from the suggested intent seed inputs. In some cases, the suggested intent seed inputs are recommended to a user by transmitting an indication of each of the suggested intent seed inputs to a user device, wherein one or more of the at least one intent seed input for each intent category in the set of intent categories are selected from the suggested intent seed inputs at the user device. The operations of 1515 may be performed according to the methods described herein. In some examples, aspects of the operations of 1515 may be performed by an intent seed input generator as described with reference to FIGS. 7 through 9.

At 1520, the analytical data store may receive a set of intent categories and at least one intent seed input for each intent category in the set of intent categories. The operations of 1520 may be performed according to the methods described herein. In some examples, aspects of the operations of 1520 may be performed by an intent category interface as described with reference to FIGS. 7 through 9.

At 1525, the analytical data store may generate, using the word embedding function and the intent classification model, at least one intent vector corresponding to each intent category in the set of intent categories, where the intent vector generated for each intent category is based on the at least one intent seed input corresponding to the respective intent category. The operations of 1525 may be performed according to the methods described herein. In some examples, aspects of the operations of 1525 may be performed by an intent vector generating component as described with reference to FIGS. 7 through 9.

At 1530, the analytical data store may receive a conversation input including a text string at an instance of the interactive conversation agent. The operations of 1530 may be performed according to the methods described herein. In some examples, aspects of the operations of 1530 may be performed by an input receiving interface as described with reference to FIGS. 7 through 9.

At 1535, the analytical data store may generate, using the word embedding function and the intent classification model, a conversation input vector based on the conversation input. The operations of 1535 may be performed according to the methods described herein. In some examples, aspects of the operations of 1535 may be performed by a conversation input generating component as described with reference to FIGS. 7 through 9.

At 1540, the analytical data store may calculate similarity scores between the conversation input vector and at least one intent vector corresponding to each intent category. The operations of 1540 may be performed according to the methods described herein. In some examples, aspects of the operations of 1540 may be performed by a vector comparison component as described with reference to FIGS. 7 through 9.

At 1545, the analytical data store may identify an intent category of the set of intent categories corresponding to the intent vector having a highest similarity score with the conversation input vector. The operations of 1545 may be performed according to the methods described herein. In some examples, aspects of the operations of 1545 may be performed by an intent categorization component as described with reference to FIGS. 7 through 9.

A method of intent classification is described. The method may include generating, using a word embedding function, an intent classification model including a set of input vectors corresponding to a corpus of unclassified conversation data received at an interactive conversation agent, receiving a set of intent categories and at least one intent seed input for each intent category in the set of intent categories, generating, using the word embedding function and the intent classification model, at least one intent vector corresponding to each intent category in the set of intent categories, where the intent vector generated for each intent category is based on the at least one intent seed input corresponding to the respective intent category, receiving a conversation input including a text string at an instance of the interactive conversation agent, generating, using the word embedding function and the intent classification model, a conversation input vector based on the conversation input, calculating similarity scores between the conversation input vector and each intent vector corresponding to each intent category, and identifying an intent category of the set of intent categories corresponding to the intent vector having a highest similarity score with the conversation input vector.

An apparatus for intent classification is described. The apparatus may include a processor, memory in electronic communication with the processor, and instructions stored in the memory. The instructions may be executable by the processor to cause the apparatus to generate, using a word embedding function, an intent classification model including a set of input vectors corresponding to a corpus of unclassified conversation data received at an interactive conversation agent, receive a set of intent categories and at least one intent seed input for each intent category in the set of intent categories, generate, using the word embedding function and the intent classification model, at least one intent vector corresponding to each intent category in the set of intent categories, where the intent vector generated for each intent category is based on the at least one intent seed input corresponding to the respective intent category, receive a conversation input including a text string at an instance of the interactive conversation agent, generate, using the word embedding function and the intent classification model, a conversation input vector based on the conversation input, calculate similarity scores between the conversation input vector and each intent vector corresponding to each intent category, and identify an intent category of the set of intent categories corresponding to the intent vector having a highest similarity score with the conversation input vector.

Another apparatus for intent classification is described. The apparatus may include means for generating, using a word embedding function, an intent classification model including a set of input vectors corresponding to a corpus of unclassified conversation data received at an interactive conversation agent, receiving a set of intent categories and at least one intent seed input for each intent category in the set of intent categories, generating, using the word embedding function and the intent classification model, at least one intent vector corresponding to each intent category in the set of intent categories, where the intent vector generated for each intent category is based on the at least one intent seed input corresponding to the respective intent category, receiving a conversation input including a text string at an instance of the interactive conversation agent, generating, using the word embedding function and the intent classification model, a conversation input vector based on the conversation input, calculating similarity scores between the conversation input vector and each intent vector corresponding to each intent category, and identifying an intent category of the set of intent categories corresponding to the intent vector having a highest similarity score with the conversation input vector.

A non-transitory computer-readable medium storing code for intent classification is described. The code may include instructions executable by a processor to generate, using a word embedding function, an intent classification model including a set of input vectors corresponding to a corpus of unclassified conversation data received at an interactive conversation agent, receive a set of intent categories and at least one intent seed input for each intent category in the set of intent categories, generate, using the word embedding function and the intent classification model, at least one intent vector corresponding to each intent category in the set of intent categories, where the intent vector generated for each intent category is based on the at least one intent seed input corresponding to the respective intent category, receive a conversation input including a text string at an instance of the interactive conversation agent, generate, using the word embedding function and the intent classification model, a conversation input vector based on the conversation input, calculate similarity scores between the conversation input vector and each intent vector corresponding to each intent category, and identify an intent category of the set of intent categories corresponding to the intent vector having a highest similarity score with the conversation input vector.

In some examples of the method, apparatuses, and non-transitory computer-readable medium described herein, generating the intent classification model further may include operations, features, means, or instructions for selecting a user input from the corpus of conversation data as a context for a context-response pair for a set of context-response pairs, selecting an agent input from the corpus of conversation data as a response for the context-response pair, assigning a first value to a label corresponding to the context-response pair if the user input and the agent input are selected from a same conversation session of the corpus of conversation data, assigning a second value to the label corresponding to the context-response pair if the user input and the agent input are selected from different conversation sessions of the corpus of conversation data, and training the intent classification model on the set of context-response pairs.

Some examples of the method, apparatuses, and non-transitory computer-readable medium described herein may further include operations, features, means, or instructions for the first value being assigned further based on the user input and the agent input being selected from within a window in the same conversation session and the second value being assigned further based on the user input and the agent input being selected from outside the window in the same conversation session.

In some examples of the method, apparatuses, and non-transitory computer-readable medium described herein, training the intent classification model on the set of context-response pairs further may include operations, features, means, or instructions for generating a context vector for each context of the set of context-response pairs, generating a response vector for each response of the set of context-response pairs, calculating similarity scores for each context-response pair of the set of context-response pairs by comparing the context vector and the response vector of each context-response pair, and determining a loss for each context-response pair of the set of context-response pairs based at least on the similarity score and the label corresponding to each context-response pair of the set of context-response pairs.

Some examples of the method, apparatuses, and non-transitory computer-readable medium described herein may further include operations, features, means, or instructions for receiving an additional intent category and additional seed input corresponding to the additional intent category, and generating, using the word embedding function and the intent classification model, an additional intent vector based on the additional seed input.

Some examples of the method, apparatuses, and non-transitory computer-readable medium described herein may further include operations, features, means, or instructions for receiving an additional conversation input at the interactive conversation agent, generating, using the word embedding function and the intent classification model, an additional conversation input vector, calculating similarity scores between the additional conversation input vector and each intent vector corresponding to each intent category and the additional intent vector corresponding to the additional category, and identifying an intent category of the set of intent categories and the additional intent category corresponding to an intent vector or the additional intent vector having a highest similarity score with the additional conversation input vector.

Some examples of the method, apparatuses, and non-transitory computer-readable medium described herein may further include operations, features, means, or instructions for separating the set of input vectors into set of clusters based on distance score calculation between each of the set of input vectors, and selecting at least one input vector from each cluster of the set of clusters, each of the selected input vectors corresponding to a suggested intent seed input, where one or more of the at least one intent seed input for each intent category in the set of intent categories may be selected from the suggested intent seed inputs.

Some examples of the method, apparatuses, and non-transitory computer-readable medium described herein may further include operations, features, means, or instructions for transmitting an indication of each of the suggested intent seed inputs to a user device, wherein one or more of the at least one intent seed input for each intent category in the set of intent categories are selected from the suggested intent seed inputs at the user device.

Some examples of the method, apparatuses, and non-transitory computer-readable medium described herein may further include operations, features, means, or instructions for displaying the set of input vectors of the intent classification model on a user interface of a user device.

In some examples of the method, apparatuses, and non-transitory computer-readable medium described herein, displaying the set of input vectors of the intent classification model further may include operations, features, means, or instructions for projecting high dimensional input vectors into two-dimensional vectors, plotting the two-dimensional vectors on a graph, and displaying the graph at the user interface of the user device.

In some examples of the method, apparatuses, and non-transitory computer-readable medium described herein, the set of intent categories includes order status, return status, return issue, product issue, return label, or a combination thereof.

In some examples of the method, apparatuses, and non-transitory computer-readable medium described herein, determining the highest similarity score further may include operations, features, means, or instructions for identifying the intent vector based on a nearest neighbor technique.

Some examples of the method, apparatuses, and non-transitory computer-readable medium described herein may further include operations, features, means, or instructions for receiving audio data including voice data at the interactive conversation agent, and converting the audio data into the conversation input including the text string. It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for intent classification, comprising:
   selecting a user input from a corpus of conversation data as a context for a context-response pair for a set of context-response pairs;
   selecting an agent input from the corpus of conversation data as a response for the context-response pair;
   assigning a first value to a label corresponding to the context-response pair if the user input and the agent input are selected from a same conversation session of the corpus of conversation data;
   assigning a second value to the label corresponding to the context-response pair if the user input and the agent input are selected from different conversation sessions of the corpus of conversation data;
   training an intent classification model using the set of context-response pairs; and
   implementing the intent classification model to identify an intent category for a conversation input received at an instance of an interactive conversation agent.

2. The method of claim 1, wherein the first value is assigned further based on the user input and the agent input being selected from within a window in the same conversation session and the second value is assigned further based on the user input and the agent input being selected from outside the window in the same conversation session.

3. The method of claim 1, wherein training the intent classification model on the set of context-response pairs further comprises:
   generating a context vector for each context of the set of context-response pairs;
   generating a response vector for each response of the set of context-response pairs;
   calculating similarity scores for each context-response pair of the set of context-response pairs by comparing the context vector and the response vector of each context-response pair; and
   determining a loss for each context-response pair of the set of context-response pairs based at least on a similarity score and the label corresponding to each context-response pair of the set of context-response pairs.

4. The method of claim 1, further comprising:
   receiving a set of intent categories and at least one intent seed input for each intent category in the set of intent categories;
   generating, using a word embedding function and the intent classification model, at least one intent vector corresponding to each intent category in the set of intent categories, wherein the intent vector generated for each intent category is based at least in part on the at least one intent seed input corresponding to the respective intent category.

5. The method of claim 4, further comprising:
   receiving the conversation input comprising a text string at the instance of the interactive conversation agent;
   generating, using the word embedding function and the intent classification model, a conversation input vector based on the conversation input;
   calculating similarity scores between the conversation input vector and each intent vector corresponding to each intent category; and
   identifying an intent category of the set of intent categories corresponding to an intent vector having a highest similarity score with the conversation input vector.

6. The method of claim 5, wherein determining the highest similarity score further comprises:
   identifying the intent vector based on a nearest neighbor technique.

7. The method of claim 5, further comprising:
   receiving audio data comprising voice data at the interactive conversation agent; and
   converting the audio data into the conversation input comprising the text string.

8. The method of claim 4, further comprising:
   separating a plurality of input vectors into set of clusters based on distance score calculation between each of the plurality of input vectors; and
   selecting at least one input vector from each cluster of the set of clusters, each of the selected input vectors corresponding to a suggested intent seed input, wherein one or more of the at least one intent seed input for each intent category in the set of intent categories are selected from the suggested intent seed inputs.

9. The method of claim 8, further comprising:
transmitting an indication of each of the suggested intent seed inputs to a user device, wherein one or more of the at least one intent seed input for each intent category in the set of intent categories are selected from the suggested intent seed inputs at the user device.

10. The method of claim 4, further comprising:
displaying a plurality of input vectors of the intent classification model on a user interface of a user device.

11. The method of claim 10, wherein displaying the plurality of input vectors of the intent classification model further comprises:
projecting high dimensional input vectors into two-dimensional vectors;
plotting the two-dimensional vectors on a graph; and
displaying the graph at the user interface of the user device.

12. The method of claim 4, wherein the set of intent categories includes order status, return status, return issue, product issue, return label, or a combination thereof.

13. The method of claim 4, wherein the at least one intent seed input is based on an input received at the interactive conversation agent.

14. An apparatus for intent classification, comprising:
a processor, memory in electronic communication with the processor; and
instructions stored in the memory and executable by the processor to cause the apparatus to:
select a user input from a corpus of conversation data as a context for a context-response pair for a set of context-response pairs;
select an agent input from the corpus of conversation data as a response for the context-response pair;
assign a first value to a label corresponding to the context-response pair if the user input and the agent input are selected from a same conversation session of the corpus of conversation data;
assign a second value to the label corresponding to the context-response pair if the user input and the agent input are selected from different conversation sessions of the corpus of conversation data;
train an intent classification model using the set of context-response pairs; and
implement the intent classification model to identify an intent category for a conversation input received at an instance of an interactive conversation agent.

15. The apparatus of claim 14, wherein the first value is assigned further based on the user input and the agent input being selected from within a window in the same conversation session and the second value is assigned further based on the user input and the agent input being selected outside the window in the same conversation session.

16. The apparatus of claim 14, wherein the instructions to train the intent classification model on the set of context-response pairs further are executable by the processor to cause the apparatus to:
generate a context vector for each context of the set of context-response pairs;
generate a response vector for each response of the set of context-response pairs;
calculate similarity scores for each context-response pair of the set of context-response pairs by comparing the context vector and the response vector of each context-response pair; and
determine a loss for each context-response pair of the set of context-response pairs based at least on a similarity score and the label corresponding to each context-response pair of the set of context-response pairs.

17. The apparatus of claim 14 wherein the instructions are further executable by the processor to cause the apparatus to:
receive a set of intent categories and at least one intent seed input for each intent category in the set of intent categories;
generate, using a word embedding function and the intent classification model, at least one intent vector corresponding to each intent category in the set of intent categories, wherein the intent vector generated for each intent category is based at least in part on the at least one intent seed input corresponding to the respective intent category.

18. A non-transitory computer-readable medium storing code for intent classification, the code comprising instructions executable by a processor to:
select a user input from a corpus of conversation data as a context for a context-response pair for a set of context-response pairs;
select an agent input from the corpus of conversation data as a response for the context-response pair;
assign a first value to a label corresponding to the context-response pair if the user input and the agent input are selected from a same conversation session of the corpus of conversation data;
assign a second value to the label corresponding to the context-response pair if the user input and the agent input are selected from different conversation sessions of the corpus of conversation data;
train an intent classification model using the set of context-response pairs; and
implement the intent classification model to identify an intent category for a conversation input received at an instance of an interactive conversation agent.

19. The non-transitory computer-readable medium of claim 18, wherein the first value is assigned further based on the user input and the agent input being selected from within a window in the same conversation session and the second value is assigned further based on the user input and the agent input being selected outside the window in the same conversation session.

20. The non-transitory computer-readable medium of claim 18, wherein the instructions to train the intent classification model on the set of context-response pairs further are executable to:
generate a context vector for each context of the set of context-response pairs;
generate a response vector for each response of the set of context-response pairs;
calculate similarity scores for each context-response pair of the set of context-response pairs by comparing the context vector and the response vector of each context-response pair; and
determine a loss for each context-response pair of the set of context-response pairs based at least on a similarity score and the label corresponding to each context-response pair of the set of context-response pairs.

21. The non-transitory computer-readable medium of claim 18, wherein the instructions are further executable to:
receive a set of intent categories and at least one intent seed input for each intent category in the set of intent categories;
generate, using a word embedding function and the intent classification model, at least one intent vector corresponding to each intent category in the set of intent categories, wherein the intent vector generated for each intent category is based at least in part on the at least one intent seed input corresponding to the respective intent category.

22. The non-transitory computer-readable medium of claim 21, wherein the instructions are further executable to:
receive the conversation input comprising a text string at the instance of the interactive conversation agent;
generate, using the word embedding function and the intent classification model, a conversation input vector based on the conversation input;
calculate similarity scores between the conversation input vector and each intent vector corresponding to each intent category; and
identify an intent category of the set of intent categories corresponding to an intent vector having a highest similarity score with the conversation input vector.

\* \* \* \* \*